(12) United States Patent
Li et al.

(10) Patent No.: US 9,591,325 B2
(45) Date of Patent: Mar. 7, 2017

(54) SPECIAL CASE HANDLING FOR MERGED CHROMA BLOCKS IN INTRA BLOCK COPY PREDICTION MODE

(71) Applicant: Microsoft Technology Licensing, LLC, Redmond, WA (US)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 14/607,056

(22) Filed: Jan. 27, 2015

(65) Prior Publication Data
US 2016/0219298 A1    Jul. 28, 2016

(51) Int. Cl.
| | |
|---|---|
| *H04N 19/52* | (2014.01) |
| *H04N 19/55* | (2014.01) |
| *H04N 19/593* | (2014.01) |
| *H04N 19/186* | (2014.01) |
| *H04N 19/51* | (2014.01) |
| *H04N 19/159* | (2014.01) |

(Continued)

(52) U.S. Cl.
CPC ........... *H04N 19/52* (2014.11); *H04N 19/186* (2014.11); *H04N 19/55* (2014.11); *H04N 19/593* (2014.11)

(58) Field of Classification Search
CPC .... H04N 19/52; H04N 19/159; H04N 19/513; H04N 19/51; H04N 19/55
See application file for complete search history.

(56) References Cited

U.S. PATENT DOCUMENTS

| 7,317,839 B2 | 1/2008 | Holcomb |
| 7,352,905 B2 | 4/2008 | Mukerjee et al. |

(Continued)

FOREIGN PATENT DOCUMENTS

| CN | 1874519 | 12/2006 |
| CN | 101009835 | 8/2007 |

(Continued)

OTHER PUBLICATIONS

"H.264 Video Compression," Visual Computing Systems, CMU 15-869, 29 pp. (Fall 2014).

(Continued)

*Primary Examiner* — Obafemi Sosanya
(74) *Attorney, Agent, or Firm* — Liwen Shi; Sandy Swain; Micky Minhas

(57) ABSTRACT

Innovations in intra block copy ("BC") prediction facilitate handling of special cases when chroma blocks are merged for purposes of the intra BC prediction. For example, encoding includes intra BC prediction for a set of adjacent units (e.g., prediction units of a coding unit). An encoder derives a block vector ("BV") value for secondary component blocks (e.g., chroma blocks) of the set of adjacent units using one or more of the BV values associated with the adjacent units. The encoding includes special case handling for any derived BV value referencing sample values outside a boundary (e.g., picture boundary, slice boundary, tile boundary). The special case handling can use constraints on values of the BVs, clipping of the derived BV value, or padding of sample values at the boundary. In some implementations, corresponding decoding includes special case handling.

15 Claims, 12 Drawing Sheets software 180 implementing one or more innovations for special case handling for merged chroma blocks in intra BC prediction mode

(51) Int. Cl.
*H04N 19/176* (2014.01)
*H04N 19/513* (2014.01)
*H04N 19/11* (2014.01)

(56) References Cited

U.S. PATENT DOCUMENTS

| | | | |
|---|---|---|---|
| 7,848,426 B2 | 12/2010 | Lee et al. | |
| 7,978,770 B2* | 7/2011 | Luo | H04N 5/145 375/240.16 |
| 8,085,845 B2 | 12/2011 | Tourapis et al. | |
| 8,116,374 B2 | 2/2012 | Gordon et al. | |
| 8,213,503 B2 | 7/2012 | Tu et al. | |
| 8,218,641 B2 | 7/2012 | Wang | |
| 8,457,200 B2 | 6/2013 | Andersson et al. | |
| 8,619,857 B2 | 12/2013 | Zhao et al. | |
| 8,644,375 B2 | 2/2014 | Segall et al. | |
| 8,693,547 B2 | 4/2014 | Bankoski et al. | |
| 8,711,945 B2 | 4/2014 | Henocq et al. | |
| 8,737,824 B1 | 5/2014 | Bultje | |
| 8,861,848 B2 | 10/2014 | Sato | |
| 9,264,713 B2 | 2/2016 | Joshi et al. | |
| 9,288,501 B2 | 3/2016 | Zheng et al. | |
| 2003/0202588 A1 | 10/2003 | Yu et al. | |
| 2006/0104527 A1 | 5/2006 | Koto et al. | |
| 2006/0274956 A1 | 12/2006 | Sohn et al. | |
| 2007/0036226 A1 | 2/2007 | Kim et al. | |
| 2007/0116110 A1 | 5/2007 | Diamant et al. | |
| 2008/0037624 A1 | 2/2008 | Walker et al. | |
| 2008/0063080 A1 | 3/2008 | Madumbu et al. | |
| 2009/0195690 A1 | 8/2009 | Wang | |
| 2010/0061461 A1 | 3/2010 | Bankoski et al. | |
| 2011/0194613 A1 | 8/2011 | Chen et al. | |
| 2012/0163457 A1 | 6/2012 | Wahadaniah et al. | |
| 2012/0177118 A1 | 7/2012 | Karczewicz et al. | |
| 2012/0189055 A1 | 7/2012 | Chien et al. | |
| 2012/0195368 A1 | 8/2012 | Chien et al. | |
| 2012/0236942 A1 | 9/2012 | Lin et al. | |
| 2012/0281760 A1 | 11/2012 | Kim | |
| 2012/0294353 A1 | 11/2012 | Fu et al. | |
| 2012/0320975 A1 | 12/2012 | Kim et al. | |
| 2012/0328209 A1 | 12/2012 | Sasai et al. | |
| 2013/0003827 A1 | 1/2013 | Misra et al. | |
| 2013/0034163 A1 | 2/2013 | Amonou et al. | |
| 2013/0050254 A1 | 2/2013 | Tran et al. | |
| 2013/0114677 A1 | 5/2013 | Baylon et al. | |
| 2013/0114713 A1 | 5/2013 | Bossen et al. | |
| 2013/0114730 A1 | 5/2013 | Joshi et al. | |
| 2013/0121417 A1 | 5/2013 | Chong et al. | |
| 2013/0128974 A1 | 5/2013 | Chien et al. | |
| 2013/0128982 A1 | 5/2013 | Kim et al. | |
| 2013/0163664 A1 | 6/2013 | Guo et al. | |
| 2013/0163668 A1 | 6/2013 | Chen et al. | |
| 2013/0182755 A1 | 7/2013 | Chen et al. | |
| 2013/0188695 A1 | 7/2013 | Maani et al. | |
| 2013/0188719 A1 | 7/2013 | Chen et al. | |
| 2013/0202051 A1 | 8/2013 | Zhou | |
| 2013/0215970 A1 | 8/2013 | Fang et al. | |
| 2013/0243093 A1 | 9/2013 | Chen et al. | |
| 2013/0258052 A1 | 10/2013 | Li et al. | |
| 2013/0259128 A1 | 10/2013 | Song et al. | |
| 2013/0272370 A1 | 10/2013 | Coban et al. | |
| 2013/0272409 A1 | 10/2013 | Seregin et al. | |
| 2013/0279577 A1 | 10/2013 | Schwarz et al. | |
| 2014/0002599 A1 | 1/2014 | Lee et al. | |
| 2014/0003531 A1 | 1/2014 | Coban et al. | |
| 2014/0016698 A1 | 1/2014 | Joshi et al. | |
| 2014/0029668 A1 | 1/2014 | Lim et al. | |
| 2014/0064360 A1 | 3/2014 | Rapaka et al. | |
| 2014/0071235 A1 | 3/2014 | Zhang et al. | |
| 2014/0086502 A1 | 3/2014 | Guo et al. | |
| 2014/0140404 A1 | 5/2014 | Liu et al. | |
| 2014/0301465 A1 | 10/2014 | Kwon et al. | |
| 2014/0355667 A1 | 12/2014 | Lei et al. | |
| 2014/0376634 A1 | 12/2014 | Guo et al. | |
| 2015/0110181 A1* | 4/2015 | Saxena | H04N 19/176 375/240.12 |
| 2015/0195559 A1* | 7/2015 | Chen | H04N 19/11 375/240.16 |

FOREIGN PATENT DOCUMENTS

| | | |
|---|---|---|
| CN | 101026761 | 8/2007 |
| CN | 101232619 | 7/2008 |
| CN | 101626512 | 1/2010 |
| CN | 102137263 | 7/2011 |
| CN | 102752595 | 10/2012 |
| CN | 103155563 | 6/2013 |
| CN | 103220512 | 7/2013 |
| CN | 103237226 | 8/2013 |
| CN | 103392340 | 11/2013 |
| CN | 103430540 | 12/2013 |
| EP | 2924996 | 9/2015 |
| JP | 2007-053561 | 3/2007 |
| WO | WO 2007/119198 | 10/2007 |
| WO | WO 2010/085899 | 8/2010 |
| WO | WO 2012/159306 | 11/2012 |
| WO | WO 2012/174990 | 12/2012 |
| WO | WO 2013/009896 | 1/2013 |
| WO | WO 2013/072484 | 5/2013 |
| WO | WO 2013/107906 | 7/2013 |
| WO | WO 2013/108922 | 7/2013 |
| WO | WO 2013/128010 | 9/2013 |
| WO | WO 2013/159643 | 10/2013 |
| WO | WO 2013/160696 | 10/2013 |
| WO | WO 2015/114322 | 8/2015 |

OTHER PUBLICATIONS

"Pixel Padding Value and Pixel Padding Range Limit," downloaded from the World Wide Web on Dec. 5, 2014, 2 pp. (document not dated).

Sahin et al., "An Efficient Hardware Architecture for H.264 Intra Prediction Algorithm," *Design, Automation & Test in Europe Conference & Exhibition*, 6 pp. (Apr. 2007).

Yang, "HEVC (High Efficiency Video Coding)," TaipeiTech, CSIE Department, downloaded from the World Wide Web on Dec. 4, 2014, 66 pp. (document not dated).

Alshina et al., "AhG5: Intra block copy within one LCU," JCTVC-O0074, 5 pp. (Oct. 2013).

Alshina et al., "AhG5: On context modelling simplification for Intra_bc_flag coding," JCTVC-O0073, 3 pp. (Oct. 2013).

Anjanappa, "Performance Analysis and Implementation of Mode Dependent DCT/DST in H.264/AVC," Master of Science in Electrical Engineering, University of Texas at Arlington, 95 pp. (Dec. 2012).

Balle et al., "Extended Texture Prediction for H.264 Intra Coding," ITU—Study Group 16 Question 6, VCEG-AE11, 7 pp. (Jan. 2007).

Bankoski et al., "VP8 Data Format and Decoding Guide," RFC 6386, 304 pp. (Nov. 2011).

Budagavi et al., "AHG8: Video coding using Intra motion compensation," JCTVC-M0350, 3 pp. (Apr. 2013).

Cha et al., "An Efficient Combined Inter and Intra Prediction Scheme for Video Coding," *Signal and Information Processing Association Annual Summit and Conf.*, 5 pp. (Oct. 2011).

Chen et al., "AHG8: Pseduo-PU-based Intra Block Copy," JCVTC-O0205, 4 pp. (Oct. 2013).

Chen et al., "Description of screen content coding technology proposal by NCTU and ITRI International," JCTVC-Q0032, 26 pp. (Mar. 2014).

Chen et al., "Description of screen content coding technology proposal by Qualcomm," JCTVC-Q0031, 18 pp. (Mar. 2014).

Chen et al., "Optimizing INTRA/INTER Coding Mode Decisions," *Int'l Symp. on Multimedia Information Processing*, pp. 561-568 (Dec. 1997).

Cohen et al., "Description of screen content coding technology proposal by Mitsubishi Electric Corporation," JCTVC-Q0036, 25 pp. (Mar. 2014).

(56) References Cited

OTHER PUBLICATIONS

Cugnini, "3D CineCast—A curation about new media technologies," downloaded from the World Wide Web, 3 pp. (Jan. 2013).
Dai et al., "Combined Inter-Frame and Inter-Color Prediction for Color Video Denoising," *IEEE Int'l Conf. on Multimedia and Expo*, pp. 884-889 (Jul. 2012).
Flynn et al., "BoG report on Range Extensions topics," JCTVC-O0352, 48 pp. (Oct. 2013).
Flynn et al., "High Efficiency Video Coding (HEVC) Range Extensions text specification: Draft 3," JCTVC-M1005_vl, 315 pp. (Apr. 2013).
Flynn et al., "High Efficiency Video Coding (HEVC) Range Extensions text specification: Draft 4," JCTVC-N1005, 322 pp. (Apr. 2013).
Flynn et al., "High Efficiency Video Coding (HEVC) Range Extensions text specification: Draft 5," JCTVC-O1005_v3, 347 pp. (Oct. 2013).
Flynn et al., "High Efficiency Video Coding (HEVC) Range Extensions text specification: Draft 6," JCTVC-P1005_v1, 355 pp. (Jan. 2014).
Fonseca, et al., "Open-Loop Prediction in H.264/AVC for High Definition Sequences," 4 pp. (document marked Sep. 3, 2007).
Guo, "RCE3: Summary Report of HEVC Range Extensions Core Experiment 3 on Intra Coding Methods for Screen Content," JCTVC-N0036, 4 pp. (Jul. 2013).
Hu et al., "Screen Content Coding for HEVC Using Edge Modes," Mitsubishi Electric Research Laboratories TR2013-034, 7 pp. (May 2013).
Hwang et al., "Fast Intra Prediction Mode Selection Scheme Using Temporal Correlation in H.264," *IEEE TENCON Conf.*, 5 pp. (Nov. 2005).
International Search Report and Written Opinion dated Mar. 30, 2016, from International Patent Application No. PCT/US2016/013500, 14 pp.
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ISO/IEC 14496-10, "Information Technology—Coding of audio-visual objects—Part 10: Advanced Video Coding," 720 pp. (May 2012).
ITU-T Recommendation H.261, "Video Codec for Audiovisual Services at $p \times 64$ kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
ITU-T Recommendation T.800, "Information technology—JPEG 2000 image coding system: Core coding system," 217 pp. (Aug. 2002).
Iwata et al., "Intra Texture Prediction Based on Repetitive Pixel Replenishment," *IEEE Int'l Conf on Image Processing*, pp. 2933-2936 (Sep. 2012).
Jin et al., "Combined Inter-Intra Prediction for High Definition Video Coding," *Proc. of Picture Coding Symposium*, 4 pp. (Nov. 2007).
Kwon et al., "AHG5: Fast encoding using early skipping of Intra block copy (IntraBC) search," JCTVC-O0245, 9 pp. (Oct. 2013).
Kwon et al., "Non-RCE3: Intra motion compensation with variable length intra MV coding," JCTVC-N0206, 11 pp. (Jul. 2013).
Kwon et al., "RCE3: Results of test 3.3 in Intra motion compensation," JCTVC-N0205, 8 pp. (Jul. 2013).
Lai et al., "Description of screen content coding technology proposal by MediaTek," JCTVC-Q0033, 31 pp. (Mar. 2014).
Lainema et al., "AHG5: Sample masking for intra block copy," JCTVC-O0351, 3 pp. (Oct. 2013).
Lainema et al., "Intra Coding of the HEVC Standard," *IEEE Trans. on Circuits and Systems for Video Technology*, vol. 22, No. 12, pp. 1792-1801 (Dec. 2012).
Lan et al., "Intra and inter coding tools for screen contents," JCTVC-E145, 11 pp. (Mar. 2011).
Laroche et al., "AHG5: Motion prediction for Intra Block Copy," JCTVC-O0122, 5 pp. (Oct. 2013).
Laroche et al., "Text and results for block vector predictor for intra block copy," JCTVC-P0304_r1, 3 pp. (Jan. 2014).
Le Meur, "Video compression Beyond H.264, HEVC," University of Rennes 1, Powerpoint presentation, 65 pp. (Nov. 2011).
Li et al., "Description of screen content coding technology proposal by Microsoft," JCTVC-Q0035, 27 pp. (Mar. 2014).
Li et al., "Hash-based intraBC search," JCTVC-Q0252, 2 pp. (Mar. 2014).
Li et al., "On Intra BC mode," JCTVC-O0183, 12 pp. (Oct. 2013).
Li et al., "RDPCM operation unification and cleanup," JCTVC-O0185, 6 pp. (Oct. 2013).
Liao et al., "A Low Complexity Architecture for Video Coding with Overlapped Block Motion Compensation," *Proc. of the 2010 IEEE 17th Int'l Conf on Image Processing*, pp. 2041-2044 (Sep. 2010).
Ma et al., "Description of screen content coding technology proposal by Huawei Technologies, Inc.," JCTVC-Q0034, 14 pp. (Mar. 2014).
Marpe et al., "Video Compression Using Nested Quadtree Structures, Leaf Merging and Improved Techniques for Motion Representation and Entropy Coding," *IEEE Trans. on Circuits and Systems for Video Technology*, 10 pp. (Dec. 2010).
McCann et al., "Samsung's Response to the Call for Proposals on Video Compression Technology," JCTVC-A124, 40 pp. (Apr. 2010).
Meenderinck et al., "Parallel Scalability of H.264," *Workshop on Programmability Issues for Multi-Core Computers*, 12 pp. (Jan. 2008).
Min et al., "Non-RCE3: Intra motion compensation for screen contents," JCTVC-N0285, 3 pp. (Jul. 2013).
Mrak et al., "Improving Screen Content Coding in HEVC by Transform Skipping," *20th European Signal Processing Conference*, pp. 1209-1213 (Aug. 2012).
Naccari et al., "AHG 8 Cross-check for JCTVC-N0231: Intra mode coding for screen contents," JCTVC-N0322, 3 pp. (Jul. 2013).
Ohm et al., "Comparison of the Coding Efficiency of Video Coding Standards—Including High Efficiency Video Coding (HEVC)," *IEEE Trans. on Circuits and Systems for Video Technology*, vol. 22, No. 12, pp. 1669-1684 (Dec. 2012).
Oudin et al., "Block Merging for Quadtree-Based Video Coding," *IEEE Int'l Conf. on Multimedia and Expo*, 6 pp. (Jul. 2011).
Pang et al., "AhG5: Constrained intra prediction for intra block copying," JCTVC-O0155, 6 pp. (Oct. 2013).
Pang et al., "AhG5: Intra block copying with padding," JCTVC-O0157, 3 pp. (Oct. 2013).
Pang et al., "Non-RCE3: Intra Motion Compensation with 2-D MVs," JCTVC-N0256, 12 pp. (Jul. 2013).
Pang et al., "Non-RCE3: Pipeline Friendly Intra Motion Compensation," JCTVC-N0254, 9 pp. (Jul. 2013).
Robert et al., "Improving Intra mode coding in H.264/AVC through block oriented transforms," *IEEE 8th Workshop on Multimedia Signal Processing*, 5 pp. (Oct. 2006).
Sarwer et al., "Improved Intra Prediction of H.264/AVC," Effective Video Coding for Multimedia Applications, Ch. 3, pp. 39-54(Apr. 2011).
Saxena et al., "HEVC Range Extensions Core Experiment 3 (RCE3): Intra Prediction techniques," JCTVC-N1123, 7 pp. (Jul. 2013).
Saxena et al., "Mode Dependent DCT/DST for Intra Prediction in Block-Based Image/Video Coding," *IEEE Int'l Conf on Image Processing*, pp. 1685-1688 (Sep. 2011).
Saxena et al., "Rext: On transform selection for Intra-BlockCopy blocks," JCTVC-O0053, 3 pp. (Oct. 2013).

(56) References Cited

OTHER PUBLICATIONS

Sharman et al., "AHG5: Intra-block-copy in Non-4:4:4 Formats," JCTVC-Q0075, 5 pp. (Mar. 2014).
SMPTE Standard, "VC-1 Compressed Video Bitstream Format and Decoding Process," SMPTE 421M-2006, 493 pp. (Feb. 2006).
Sole et al., "HEVC Range Extensions Core Experiment 3 (RCE3): Intra block copy refinement," JCTVC-O1123, 6 pp. (Oct. 2013).
Sullivan et al., "Meeting report of the 14th meeting of the Joint Collaborative Team on Video Coding," JCTVC-N_Notes_dA, 162 pp. (Jul. 2013).
Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).
Xiu et al., "Description of screen content coding technology proposal by InterDigital," JCTVC-Q0037, 30 pp. (Mar. 2014).
Xu et al., "Intra-predictive Transforms for Image Coding," *IEEE Int'l Symp. on Circuits and Systems*, pp. 2822-2825 (May 2009).
Yang et al., "Remote Dynamic Three-Dimensional Scene Reconstruction," PLoS One, 12 pp. (May 2013).
Yu et al., "New Intra Prediction using Intra-Macroblock Motion Compensation," JVT-C151, 10 pp. (May 2002).
Zhang et al., "Motion Vector Derivation of Deformable Block," *IEEE Int'l Conf. on Image Processing*, pp. 1549-1552 (Sep. 2012).
Zhao et al., "Efficient Realization of Parallel HEVC Intra Encoding," *Int'l Workshop on Programmability on Emerging Multimedia Systems and Applications*, 6 pp. (Jul. 2013).
Zhu et al., "AMP for Intra BC prediction," JCTVC-Q0135, 3 pp. (Mar. 2014).
Zhu et al., "Initialization of block vector predictor for intra block copy," JCTVC-P0217_v2, 7 pp. (Jan. 2014).
Zhu et al., "Non-RCE3 subtest B.2—Results and Search Methods for Intra block copying for CU-level block vectors with TU-level prediction processing," JCTVC-P0218, 3 pp. (Jan. 2014).
Zhu et al., "Ping-Pong block vector predictor for intra block copy," JCTVC-Q0134, 5 pp. (Mar. 2014).
Zhu et al., "Screen content coding using 2-D dictionary mode," JCTVC-00357, 4 pp. (Oct. 2013).
Zou et al., "View Synthesis Prediction Using Skip and Merge Candidates for HEVC-based 3D Video Coding," *IEEE Int'l Symp. on Circuits and Systems*, 6 pp. (May 2013).
Written Opinion of the International Preliminary Examining Authority dated Dec. 12, 2016, from International Patent Application No. PCT/US2016/013500, 8 pp.

* cited by examiner

FIG. 1
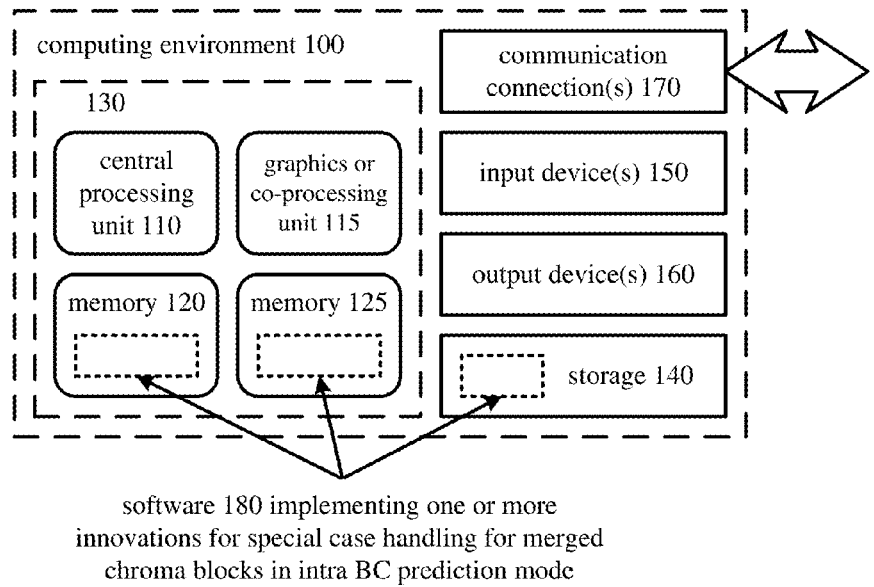
software 180 implementing one or more
innovations for special case handling for merged
chroma blocks in intra BC prediction mode
FIG. 2a      201
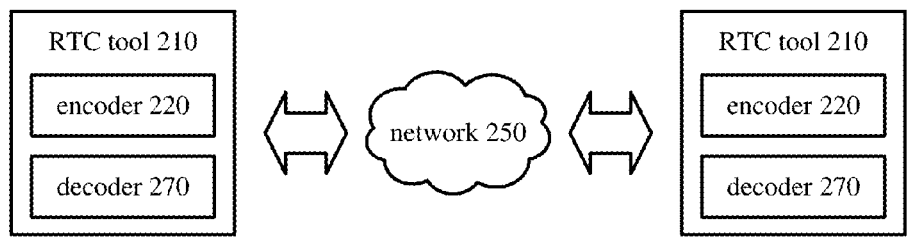
FIG. 2b      202

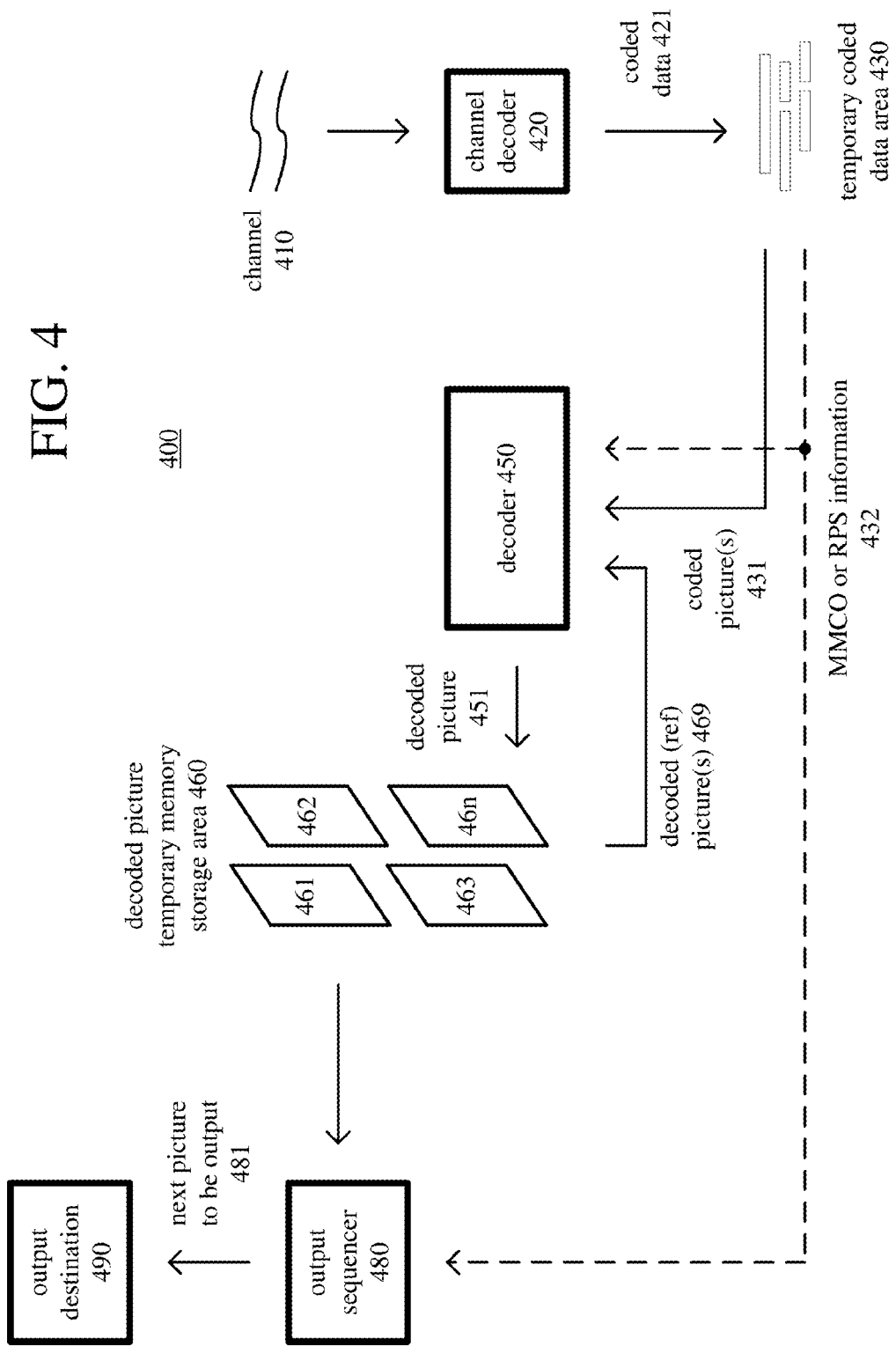

500

600 intra block copy mode

BV value (740) for current block (730) of current picture (710), indicating a displacement to a reference block (750) in the current picture (710)

BV values (841, 842, 843, 844) indicating displacements to candidate reference blocks for current block (830) of current picture (810)

900 z-scan order for current unit and units that may include bottom-right position of the reference block portion 1000 of luma component of picture 1010 in YUV 4:2:0 format portion 1001 of chroma component of picture 1010 in YUV 4:2:0 format portion 1000 of luma component of picture 1010 in YUV 4:2:0 format portion 1001 of chroma component of picture 1010 in YUV 4:2:0 format constrain BV of second 4x8 PU two 4x8 PUs of picture in YUV 4:2:0 format constrain BV of second 8x4 PU two 8x4 PUs of picture in YUV 4:2:0 format constrain BV of fourth 4x4 PU four 4x4 PUs of picture in YUV 4:2:0 format constrain BV of second 4x8 PU two 4x8 luma blocks of picture in YUV 4:2:2 format constrain BV of second 4x4 PU constrain BV of fourth 4x4 PU four 4x4 PUs of picture in YUV 4:2:2 format

FIG. 14

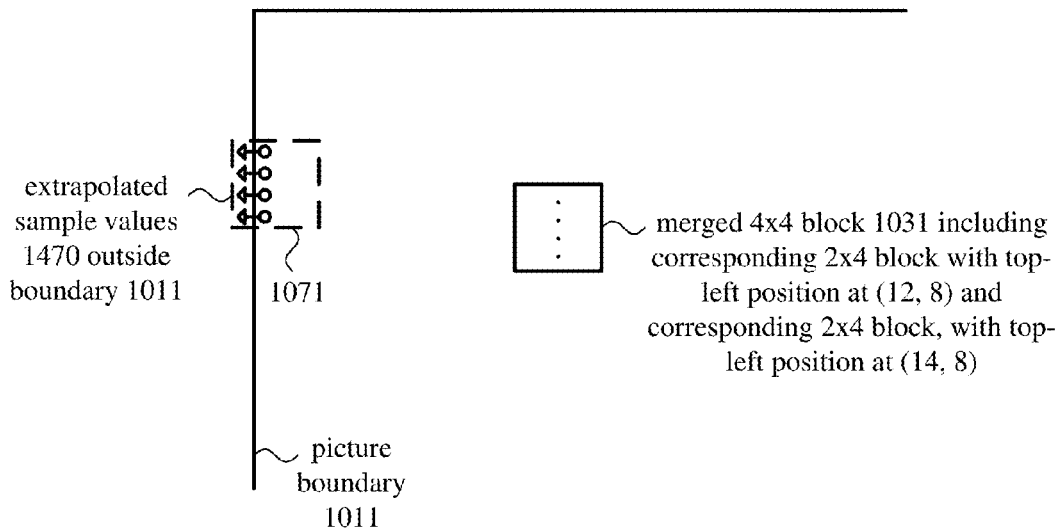

portion 1001 of chroma component of picture 1010 in YUV 4:2:0 format extrapolated sample values 1470 outside boundary 1011

1071 merged 4x4 block 1031 including corresponding 2x4 block with top-left position at (12, 8) and corresponding 2x4 block, with top-left position at (14, 8)

picture boundary 1011

FIG. 15  1500

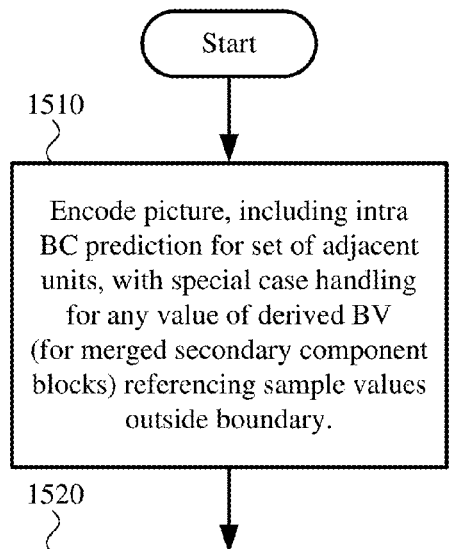

Start

1510 — Encode picture, including intra BC prediction for set of adjacent units, with special case handling for any value of derived BV (for merged secondary component blocks) referencing sample values outside boundary.

1520 — Output the encoded data.

End

FIG. 16  1600

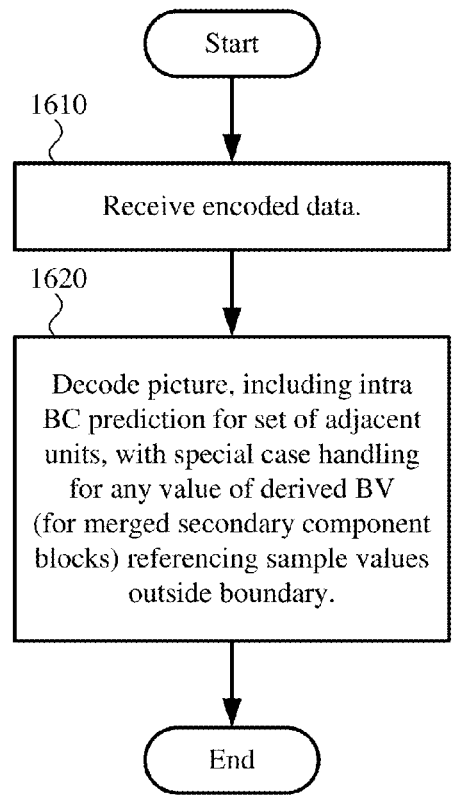

Start

1610 — Receive encoded data.

1620 — Decode picture, including intra BC prediction for set of adjacent units, with special case handling for any value of derived BV (for merged secondary component blocks) referencing sample values outside boundary.

End

SPECIAL CASE HANDLING FOR MERGED CHROMA BLOCKS IN INTRA BLOCK COPY PREDICTION MODE

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

A video source such as a camera or screen capture module typically provides video that is converted to a format such as a YUV 4:4:4 chroma sampling format. A YUV format includes a luma (or Y) component with sample values representing approximate brightness values as well as multiple chroma (or U and V) components with sample values representing color difference values. In a YUV 4:4:4 format, chroma information is represented at the same spatial resolution as luma information. Many commercially available video encoders and decoders support a YUV 4:2:0 chroma sampling format or YUV 4:2:2 chroma sampling format. A YUV 4:2:0 format is a format that sub-samples chroma information compared to a YUV 4:4:4 format, so that chroma resolution is half that of luma resolution both horizontally and vertically. As a design principle, the decision to use a YUV 4:2:0 format for encoding/decoding is premised on the understanding that, for typical use cases such as encoding/decoding of natural, camera-captured video content, viewers do not ordinarily notice significant visual differences between video encoded/decoded in a YUV 4:2:0 format and video encoded/decoded in a YUV 4:4:4 format. The compression advantages for the YUV 4:2:0 format, which has fewer samples per picture, are therefore compelling. A YUV 4:2:2 format is a format that sub-samples chroma information compared to a YUV 4:4:4 format, so that chroma resolution is half that of luma resolution horizontally.

Intra block copy ("BC") is a prediction mode under development for H.265/HEVC extensions. For intra BC prediction mode, the sample values of a current block of a picture are predicted using previously reconstructed sample values in the same picture. A block vector ("BV") value indicates a displacement from the current block to a reference block of the picture that includes the previously reconstructed sample values used for prediction. The BV value is signaled in the bitstream. In some designs, a block of luma sample values ("luma block") can be a 4×4 block, 4×8 block, 8×4 block, 8×8 block, or block having a larger size. If the chroma sampling format is 4:2:0 or 4:2:2, a corresponding block of chroma sample values ("chroma block") can be a 2×2 block, 2×4 block, 2×8 block, 4×2 block, 4×4 block, or block having a larger size. When the minimum block size for intra BC prediction is 4×4, some chroma blocks (e.g., 2×2, 2×4, 2×8, or 4×2 blocks) may be smaller than the minimum block size. The small chroma blocks are merged into a single block for purposes of intra BC prediction with a single BV value. The single BV value for the merged chroma blocks is derived by selecting the BV value of the bottom-most, right-most block among the corresponding luma blocks for the merged chroma blocks. In some cases, the BV value derived by this rule references sample values outside the picture, which are unavailable for intra BC prediction. Although such cases may be rare, they can cause encoding or decoding to fail unexpectedly.

SUMMARY

In summary, the detailed description presents innovations in intra block copy ("BC") prediction. In particular, the innovations facilitate handling of special cases when chroma blocks are merged for purposes of intra BC prediction.

According to one aspect of the innovations described herein, a media encoder encodes a picture to produce encoded data and outputs the encoded data. The encoding includes intra BC prediction for a set of adjacent units (e.g., prediction units of a coding unit) of the picture. For each unit of the set of adjacent units, the media encoder performs the intra BC prediction for a primary component block (e.g., luma block) of the unit using a block vector ("BV") value associated with the unit. The media encoder derives a BV value for secondary component blocks (e.g., chroma blocks) of the set of adjacent units based at least in part on one or more of the BV values associated with the adjacent units. Then, the media encoder performs the intra BC prediction for the secondary component blocks using the derived BV value. Adjacent blocks among the secondary component blocks are merged for purposes of the intra BC prediction. The encoding includes special case handling for any value of the derived BV value referencing sample values outside a boundary (e.g., picture boundary, slice boundary, tile boundary). For example, the special case handling uses constraints on values of the BVs, clipping of the derived BV value, or padding of sample values at the boundary.

According to another aspect of the innovations described herein, a media decoder receives encoded data and decodes a picture using the encoded data. The decoding includes intra BC prediction for a set of adjacent units (e.g., prediction units of a coding unit) of the picture. For each unit of the set of adjacent units, the media decoder performs the intra BC prediction for a primary component block (e.g., luma block) of the unit using a BV value associated with the unit. The media decoder derives a BV value for secondary component blocks (e.g., chroma blocks) of the set of adjacent units based at least in part on one or more of the BV values associated with the adjacent units. Then, the media decoder performs the intra BC prediction for the secondary component blocks using the derived BV value. Adjacent blocks among the secondary component blocks are merged for purposes of the intra BC prediction. The decoding includes special case handling for any value of the derived BV value referencing sample values outside a boundary (e.g., picture boundary, slice boundary, tile boundary). For example, the special case handling uses constraints on values of the BVs, clipping of the derived BV value, or padding of sample values at the boundary.

The innovations can be implemented as part of a method, as part of a computing system configured to perform the method or as part of a tangible computer-readable media storing computer-executable instructions for causing a computing system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 1 is a diagram of an example computing system in which some described embodiments can be implemented.

FIGS. 2a and 2b are diagrams of example network environments in which some described embodiments can be implemented.

FIG. 4 is a diagram of an example decoder system in conjunction with which some described embodiments can be implemented.

FIG. 14 is a diagram illustrating aspects of special case handling for merged chroma blocks in intra BC prediction mode by padding sample values away from a boundary of a picture.

FIGS. 15 and 16 are flowcharts illustrating generalized techniques for encoding and decoding, respectively, with special case handling for merged chroma blocks in intra BC prediction mode, according to some described embodiments.

DETAILED DESCRIPTION

Figure 3:
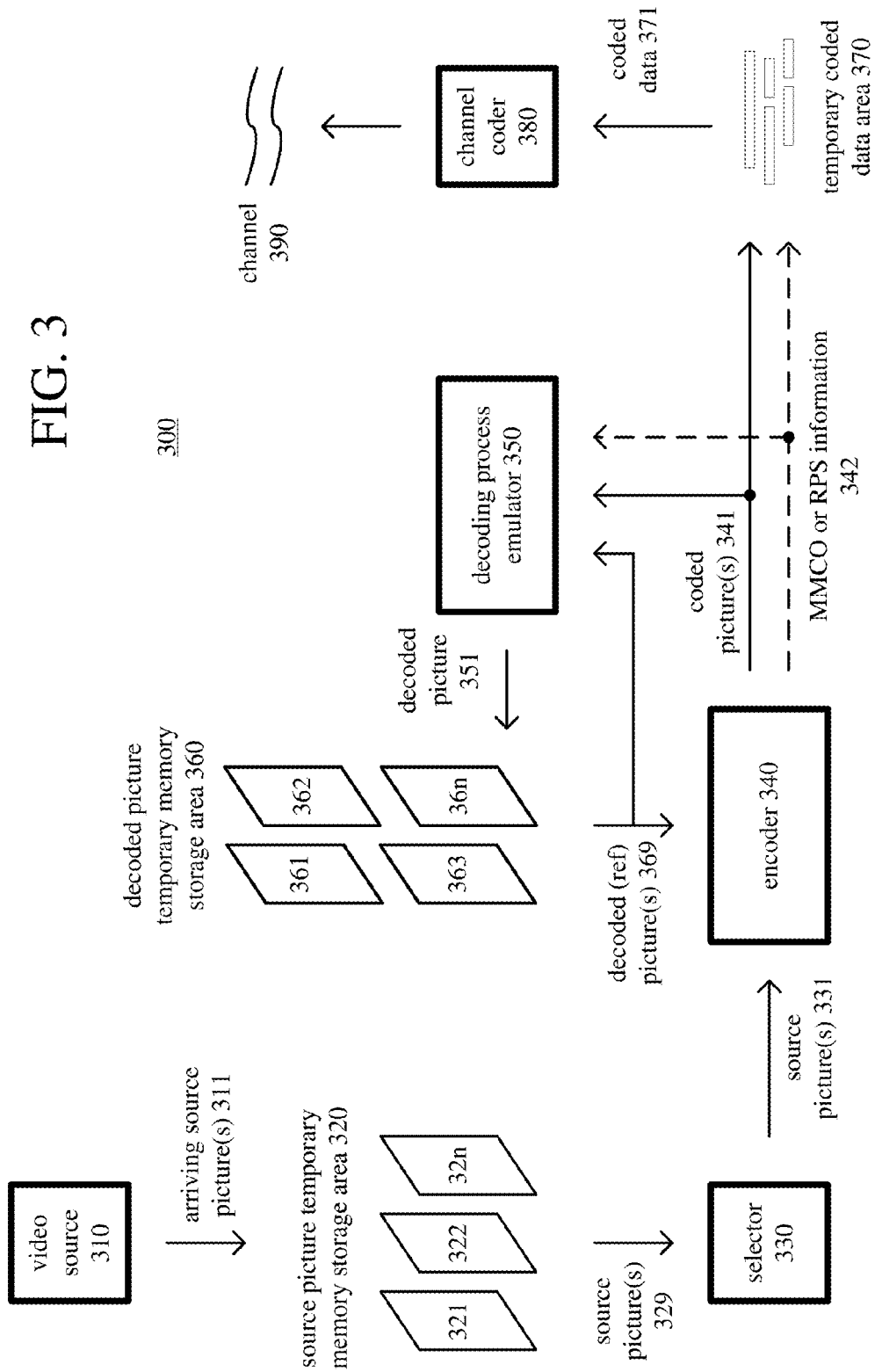
FIG. 3 is a diagram of an example encoder system in conjunction with which some described embodiments can be implemented.

The detailed description presents innovations in intra block copy ("BC") prediction. In particular, the innovations facilitate handling of special cases when chroma blocks are merged for purposes of intra BC prediction.

Although operations described herein are in places described as being performed by a video encoder or video decoder, in many cases the operations can be performed by another type of media processing tool (e.g., image encoder or image decoder).

Some of the innovations described herein are illustrated with reference to terms specific to extensions of the H.265/HEVC standard. For example, reference is made to the draft version JCTVC-R1005 of the screen content coding/decoding extensions for the H.265/HEVC standard—"High Efficiency Video Coding (HEVC) Screen Content Coding: Draft 1," JCTVC-R1005_v3, September 2014. The innovations described herein can also be implemented for other standards or formats.

Many of the innovations described herein can improve rate-distortion performance when encoding certain "artificially-created" video content such as screen capture content. In general, screen capture video (also called screen content video) is video that contains rendered text, computer graphics, animation-generated content or other similar types of content captured when rendered to a computer display, as opposed to camera-captured video content only. Screen capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen capture content include remote desktop conferencing and encoding/decoding of graphical overlays on natural video or other "mixed content" video. Several of the innovations described herein are adapted for encoding of screen content video or other artificially-created video. These innovations can also be used for natural video, but may not be as effective.

Many of the examples described herein involve intra BC prediction for blocks of luma sample values (luma blocks) and corresponding blocks of chroma sample values (chroma blocks) for a picture in a YUV 4:2:2 format or YUV 4:2:0 format. In general, as used herein, the term YUV indicates any color space with a luma (or luminance) component and one or more chroma (or chrominance) components. Chroma sample values may be sub-sampled to a lower chroma sampling rate (e.g., for YUV 4:2:0 format or YUV 4:2:2 format), or the chroma sample values may have the same resolution as the luma sample values (e.g., for YUV 4:4:4 format). Alternatively, video can be organized according to another format (e.g., RGB 4:4:4 format, GBR 4:4:4 format or BGR 4:4:4 format). In general, a primary component block is a block of sample values for a primary component (such as Y for a YUV format, or R for an RGB format), and a secondary component block is a block of sample values for a secondary component (such as U or V for a YUV format, or G or B for an RGB format).

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for special case handling for merged chroma blocks (or other merged secondary component blocks) in intra BC prediction mode, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for special case handling for merged chroma blocks (or other merged secondary component blocks) in intra BC prediction mode.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as part of an operating system module, as part of an application library, as part of a standalone application or using special-purpose hardware. Overall, the encoder system (300) receives a sequence of source video pictures (311) from a video source (310) and produces encoded data as output to a channel (390). The encoded data output to the channel can include content encoded using special case handling for merged chroma blocks (or other merged secondary component blocks) in intra BC prediction mode.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing (e.g., filtering) of the selected picture (331) before encoding. The pre-processing can include color space conversion into primary (e.g., luma) and secondary (e.g., chroma differences toward red and toward blue) color components and resampling processing (e.g., to reduce the spatial resolution of chroma components) for encoding. Before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Alternatively, video can be organized according to another format (e.g., RGB 4:4:4 format, GBR 4:4:4 format or BGR 4:4:4 format). In general, a primary component block is a block of sample values for a primary component (such as Y for a YUV format, or R for an RGB format), and a secondary component block is a block of sample values for a secondary component (such as U or V for a YUV format, or G or B for an RGB format).

The encoder (340) encodes the selected picture (331) to produce a coded picture (341) and also produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

Generally, the encoder (340) includes multiple encoding modules that perform encoding tasks such as partitioning into tiles, intra-picture prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding.

For syntax according to the H.265/HEVC standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-predicted CU, the PU has the same size as the CU, unless the CU has the smallest size (e.g., 8×8). In that case, the CU can be split into smaller PUs (e.g., four 4×4 PUs, two 4×8 PUs, or two 8×4 PUs, if the smallest CU size is 8×8, for intra-picture prediction) or the PU can have the smallest CU size, as indicated by a syntax element for the CU. Alternatively, for symmetric or asymmetric partitions used in intra BC prediction, a larger CU can be split into multiple PUs.

A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CTB, CB, PB or TB, or some other set of sample values, depending on context. The term "unit" can indicate a macroblock, CTU, CU, PU, TU or some other set of blocks, or it can indicate a single block, depending on context. A luma block (e.g., a luma CTB, luma CB, or luma PB) is an example of a primary component block for a YUV color space. The label "luma block" is sometimes used, however, to indicate a primary component block even for another color space such as an RGB color space, BGR color space, or GBR color space. Similarly, a chroma block (e.g., a chroma CTB, chroma CB, or chroma PB) is an example of a secondary component block for a YUV color space. The label "chroma block" is sometimes used, however, to indicate a secondary component block even for another color space such as an RGB color space, BGR color space, or GBR color space.

Returning to FIG. 3, the encoder represents an intra-coded block of a source picture (331) in terms of prediction from other, previously reconstructed sample values in the picture (331). For intra BC prediction, an intra-picture estimator estimates displacement from a current block to a position in the other, previously reconstructed sample values in the picture. A reference block is a block of sample values in the picture that are used to generate prediction values for the current block. The reference block can be indicated with a block vector ("BV") value (determined in BV estimation). Depending on implementation, the encoder can perform BV estimation for a block using input sample values or reconstructed sample values (previously encoded sample values in the same picture). When special case handling for merged chroma blocks (or other merged secondary component blocks) in intra BC prediction mode is enabled, in some implementations, the intra-picture estimator can determine BV values in intra BC prediction consistent with constraints on locations of reference regions, as explained below.

For intra spatial prediction for a block, the intra-picture estimator estimates extrapolation of the neighboring reconstructed sample values into the block.

The intra-picture estimator can output prediction information (such as BV values for intra BC prediction or prediction mode (direction) for intra spatial prediction), which is entropy coded. An intra-picture prediction predictor applies the prediction information to determine intra prediction values. When special case handling for merged chroma blocks in intra BC prediction mode is enabled, in some implementations, the intra-picture prediction predictor can clip certain BV values, perform sample value padding, or select among candidate BV values according to a priority order, as explained below.

For a palette coding mode, the encoder (340) represents at least some of the sample values of a CU or other unit using a palette. The palette represents colors used in the unit. For example, the palette maps index values 0, 1, 2, . . . , p to corresponding colors. During encoding of the unit, appropriate index values replace sample values at positions in the unit. A rare value in the unit can be encoded using an escape code value and literal values, instead of using an index value in the palette. The palette can change from unit to unit, and information specifying the palettes can be signaled in the bitstream.

The encoder (340) represents an inter-picture coded, predicted block of a source picture (331) in terms of prediction from reference pictures. A motion estimator estimates the motion of the block with respect to one or more reference pictures (369). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. The motion estimator outputs motion information such as motion vector ("MV") information, which is entropy coded. A motion compensator applies MVs to reference pictures (369) to determine motion-compensated prediction values for inter-picture prediction.

The encoder can determine the differences (if any) between a block's prediction values (intra or inter) and corresponding original values. These prediction residual values are further encoded using a frequency transform (if the frequency transform is not skipped), quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, BV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some implementations, the frequency transform can be skipped. In this case, prediction residual values can be quantized and entropy coded. When the palette coding mode is used, the entropy coder can encode palette data.

An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

The coded pictures (341) and MMCO/RPS information (342) (or information equivalent to the MMCO/RPS information (342), since the dependencies and ordering structures for pictures are already known at the encoder (340)) are processed by a decoding process emulator (350). The decoding process emulator (350) implements some of the functionality of a decoder, for example, decoding tasks to reconstruct reference pictures. In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as part of an operating system module, as part of an application library, as part of a standalone application or using special-purpose hardware. Overall, the decoder system (400) receives coded data from a channel (410) and produces reconstructed pictures as output for an output destination (490). The received encoded data can include content encoded using special case handling for merged chroma blocks (or other merged secondary component blocks) in intra BC prediction mode.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded pictures (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded picture (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded picture (431) to produce a corresponding decoded picture (451). A picture can be partitioned into multiple tiles of the same size or different sizes. A picture can also be organized as one or more slices. The content of a slice or tile can be further partitioned into blocks or other sets of sample values.

As appropriate, when performing its decoding process, the decoder (450) may use one or more previously decoded pictures (469) as reference pictures for inter-picture prediction. The decoder (450) reads such previously decoded pictures (469) from a decoded picture temporary memory storage area (460). Generally, the decoder (450) includes multiple decoding modules that perform decoding tasks such as entropy decoding, intra-picture prediction, motion-compensated inter-picture prediction, inverse quantization, inverse frequency transforms (if not skipped), and merging of tiles. The exact operations performed by the decoder (450) can vary depending on compression format.

For example, the decoder (450) receives encoded data for a compressed picture or sequence of pictures and produces output including decoded picture (451). In the decoder (450), a buffer receives encoded data for a compressed picture and, at an appropriate time, makes the received encoded data available to an entropy decoder. The entropy decoder entropy decodes entropy-coded quantized data as well as entropy-coded side information, typically applying the inverse of entropy encoding performed in the encoder. When the palette decoding mode is used, the entropy decoder can decode palette data.

A motion compensator applies motion information to one or more reference pictures to form motion-compensated prediction values for any inter-coded blocks of the picture being reconstructed. An intra-picture prediction module can spatially predict sample values of a current block from neighboring, previously reconstructed sample values. Or, for intra BC prediction, the intra-picture prediction module can predict sample values of a current block using previously reconstructed sample values of a reference block in the picture, which is indicated with a BV value. When special case handling for merged chroma blocks (or other merged secondary component blocks) in intra BC prediction mode is enabled, in some implementations, BV values are consistent with constraints on locations of reference regions, as explained below. In other implementations, when special case handling for merged chroma blocks (or other merged secondary component blocks) in intra BC prediction mode is enabled, the intra-picture prediction module can clip certain BV values, perform sample value padding, or select among candidate BV values according to a priority order, as explained below.

The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-picture predicted block, the decoder (450) combines reconstructed prediction residual values with motion-compensated prediction values. The decoder (450) can similarly combine prediction residual values with prediction values from intra-picture prediction.

For a palette decoding mode, the decoder (450) uses a palette that represents at least some of the sample values of a CU or other unit. The palette maps index values to corresponding colors. During decoding, for positions in the unit, index values from the palette are replaced with the appropriate sample values. An escape coded value in the unit can be decoded using an escape code value and literal values. The palette can change from unit to unit, and information specifying the palettes can be signaled in the bitstream.

An adaptive deblocking filter is included within the motion compensation loop in the video decoder (450) to smooth discontinuities across block boundary rows and/or columns in the decoded picture (451). Other filtering (such as de-ringing filtering, ALF, or SAO filtering; not shown) can alternatively or additionally be applied as in-loop filtering operations.

The decoded picture temporary memory storage area (460) includes multiple picture buffer storage areas (461, 462, ..., 46n). The decoded picture storage area (460) is an example of a decoded picture buffer. The decoder (450) uses the MMCO/RPS information (432) to identify a picture buffer (461, 462, etc.) in which it can store a decoded picture (451). The decoder (450) stores the decoded picture (451) in that picture buffer.

An output sequencer (480) identifies when the next picture to be produced in output order is available in the decoded picture storage area (460). When the next picture (481) to be produced in output order is available in the decoded picture storage area (460), it is read by the output sequencer (480) and output to the output destination (490) (e.g., display). In general, the order in which pictures are output from the decoded picture storage area (460) by the output sequencer (480) may differ from the order in which the pictures are decoded by the decoder (450).

V. Example Video Encoders.

Figure 5A:
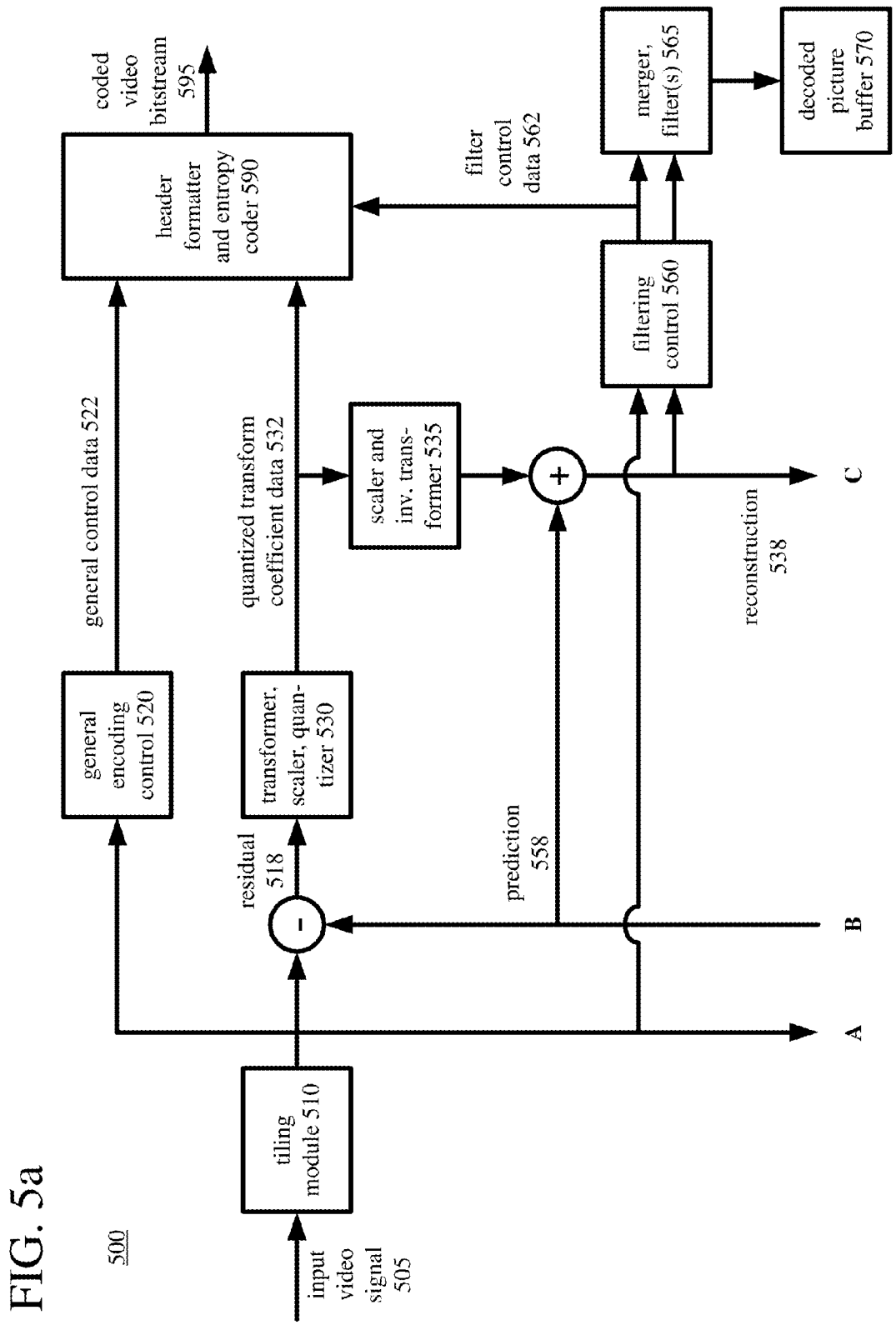
FIGS. 5a and 5b are diagrams illustrating an example video encoder in conjunction with which some described embodiments can be implemented.
Figure 5B:
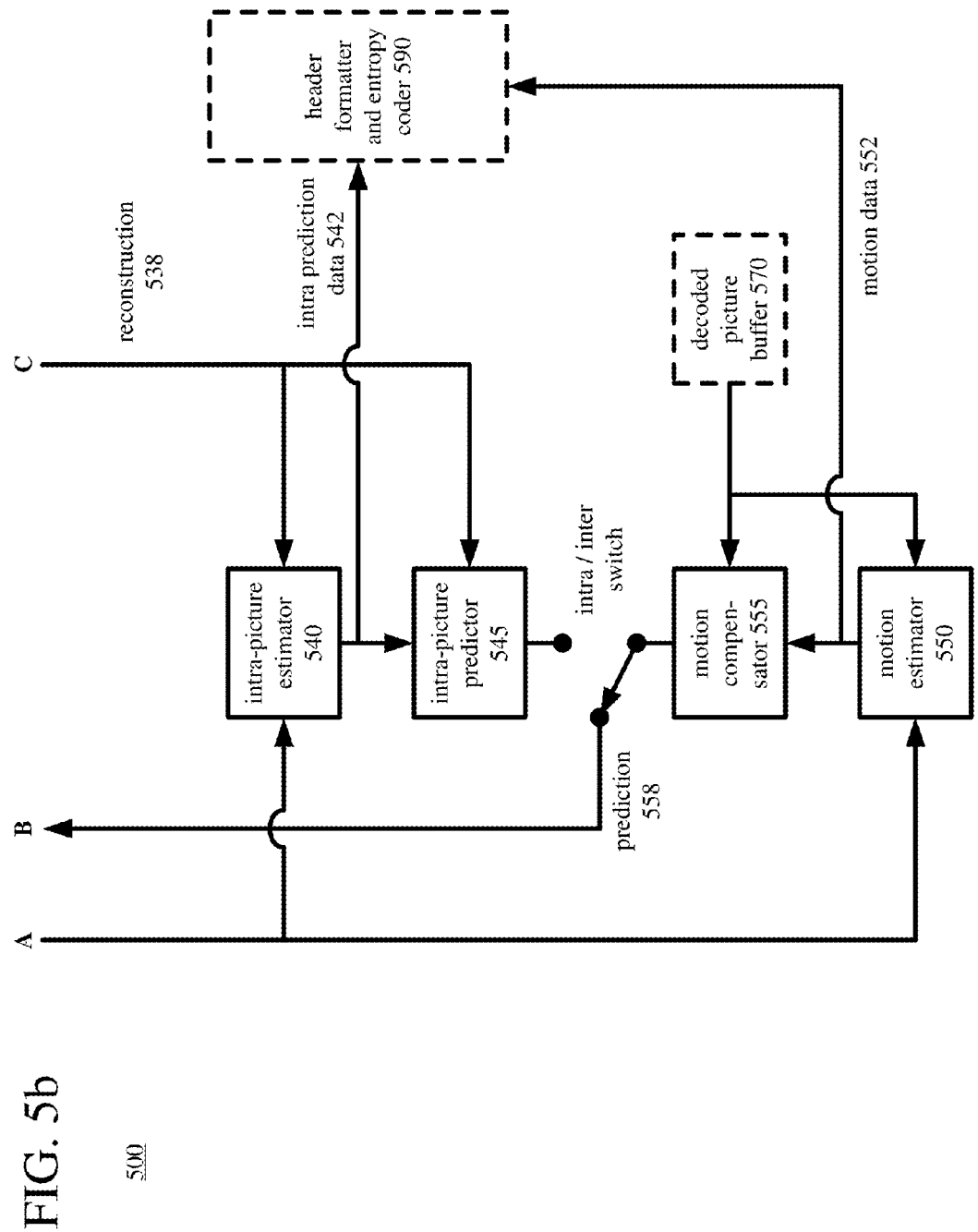

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TUs (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use intra BC prediction during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of a current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture.

Or, for intra BC prediction, an intra-picture estimator (540) estimates displacement from a current block to a position in the other, previously reconstructed sample values. A reference block of sample values in the picture is used to generate prediction values for the current block. For example, for intra BC prediction, the intra-picture estimator (540) estimates displacement from a current block to a reference block, which can be indicated with a BV value. When special case handling for merged chroma blocks in intra BC prediction mode is enabled, in some implementations, the intra-picture estimator (540) can determine BV values in intra BC prediction consistent with constraints on locations of reference regions, as explained below.

Depending on implementation, the intra-picture estimator (540) can perform BV estimation for the current block using input sample values, reconstructed sample values before in-loop filtering, or reconstructed sample values after in-loop filtering. In general, by using input sample values or unfiltered, reconstructed sample values for BV estimation, the intra-picture estimator (540) can avoid a sequential-processing bottleneck (which may result from filtering reconstructed sample values of a reference block before BV estimation/intra BC prediction). On the other hand, storing the unfiltered, reconstructed sample values uses additional memory. Also, if in-loop filtering is applied prior to BV estimation, there may be a region of influence that overlaps between the filtering process that will be applied after the current block is decoded and the region being used for BV estimation/intra BC prediction. In such a case, the BV estimation/intra BC prediction would be applied before that aspect of the filtering operation. In some implementations, the encoder can apply some in-loop filtering operations before BV estimation/intra BC prediction, and perform additional or alternative filtering in a later processing stage.

The intra-picture estimator (540) produces as side information intra prediction data (542), such as information indicating whether intra prediction uses spatial prediction or intra BC prediction, prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of a current block using previously reconstructed sample values of a reference block, which is indicated by a displacement (BV value) for the current block. In some cases, a BV value can be a predicted value. In other cases, the BV value can be different than its predicted value, in which case a differential indicates the difference between the predicted value and BV value. When special case handling for merged chroma blocks (or other merged secondary component blocks) in intra BC prediction mode is enabled, in some implementations, the intra-picture predictor (545) can clip certain BV values, perform sample value padding, or select among candidate BV values according to a priority order, as explained below.

For a palette coding mode, the encoder (500) represents at least some of the sample values of a CU or other unit using a palette. The palette represents colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel, where a pixel is a set of co-located sample values. For encoding of the unit, index values replace the sample values of pixels in the unit. A rare value in the unit can be encoded using an escape code value and literal values, instead of using an index value in the palette. The palette can change from unit to unit, and palette data specifying the palettes can be signaled in the bitstream.

The intra/inter switch selects whether the prediction (558) for a given block will be a motion-compensated prediction or intra-picture prediction.

In some example implementations, no residual is calculated for a unit encoded in palette coding mode or intra BC prediction mode. Instead, residual coding is skipped, and the predicted sample values are used as the reconstructed sample values.

When residual coding is not skipped, the difference (if any) between a block of the prediction (558) and a corresponding part of the original current picture of the input video signal (505) provides values of the residual (518). During reconstruction of the current picture, when residual values have been encoded/signaled, reconstructed residual values are combined with the prediction (558) to produce an approximate or exact reconstruction (538) of the original content from the video signal (505). (In lossy compression, some information is lost from the video signal (505).)

As part of residual coding, in the transformer/scaler/quantizer (530), when a frequency transform is not skipped, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The transformer/scaler/quantizer (530) can apply a transform with variable block sizes. In this case, the transformer/scaler/quantizer (530) can determine which block sizes of transforms to use for the residual values for a current block. The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (532) is provided to the header formatter/entropy coder (590). If the frequency transform is skipped, the scaler/quantizer can scale and quantize the blocks of prediction residual data (or sample value data if the prediction (558) is null), producing quantized values that are provided to the header formatter/entropy coder (590).

To reconstruct residual values, in the scaler/inverse transformer (535), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (500) combines reconstructed residual values with values of the prediction (558) (e.g., motion-compensated prediction values, intra-picture prediction values) to form the reconstruction (538). When residual values have not been encoded/signaled, the encoder (500) uses the values of the prediction (558) as the reconstruction (538).

For intra-picture prediction, the values of the reconstruction (538) can be fed back to the intra-picture estimator (540) and intra-picture predictor (545). The values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax elements within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the motion data (552), the header formatter/entropy coder (590) can select and entropy code merge mode index values, or a default MV predictor can be used. In some cases, the header formatter/entropy coder (590) also determines MV differentials for MV values (relative to MV predictors for the MV values), then entropy codes the MV differentials, e.g., using context-adaptive binary arithmetic coding. For the intra prediction data (542), a BV value can be encoded using prediction. The prediction can use a default predictor (e.g., a BV value from one or more neighboring blocks). When multiple predictors are possible, a predictor index can indicate which of the multiple predictors to use for prediction of the BV value. The header formatter/entropy coder (590) can select and entropy code predictor index values (for intra BC prediction), or a default predictor can be used. In some cases, the header formatter/entropy coder (590) also determines differentials (relative to predictors for the BV values), then entropy codes the differentials, e.g., using context-adaptive binary arithmetic coding. For palette coding mode, the header formatter/entropy coder (590) can encode palette data.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
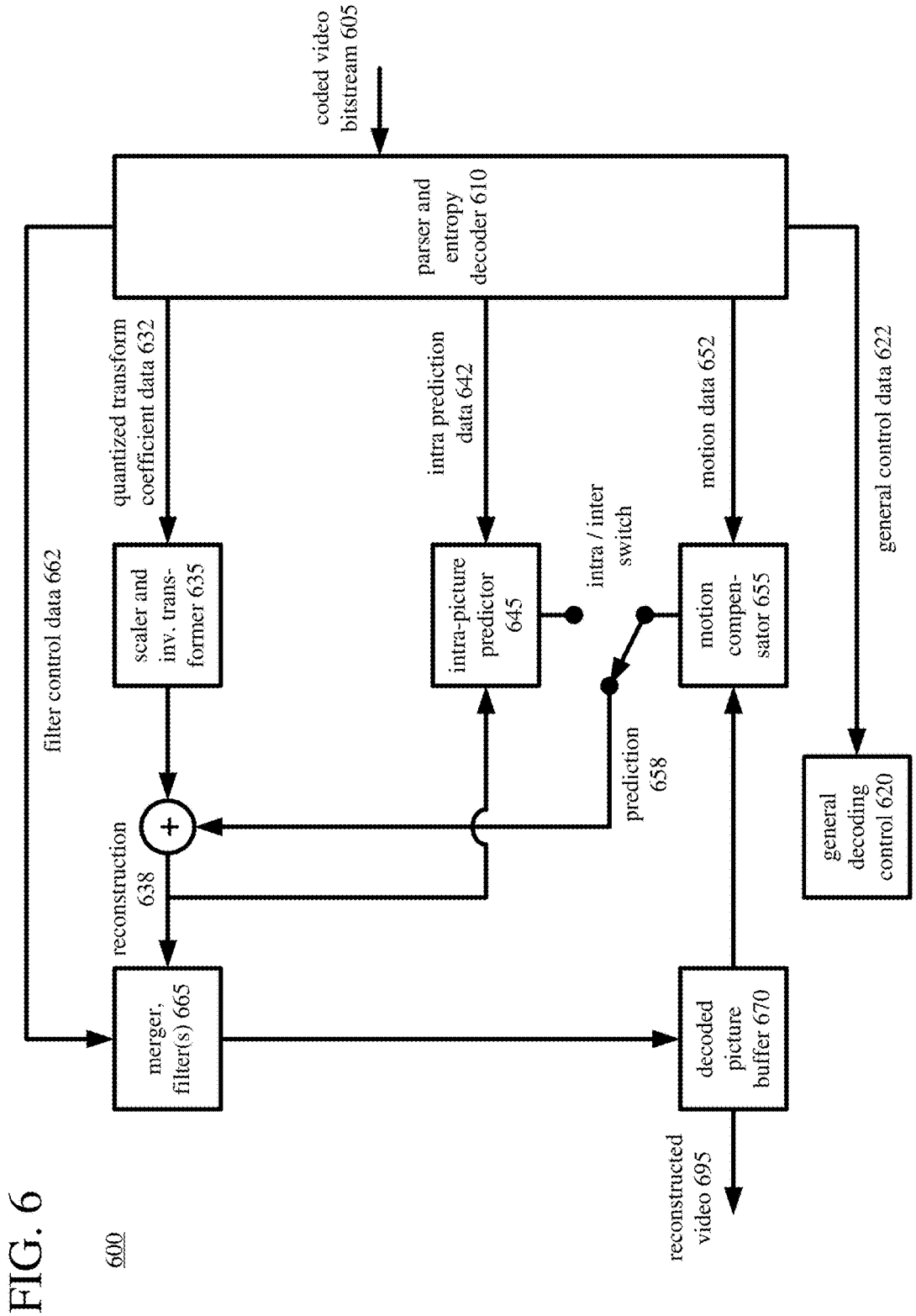
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

A picture can be organized as multiple tiles of the same size or different sizes. A picture can also be organized as one or more slices. The content of a slice or tile can be further organized as blocks or other sets of sample values. The decoder (600) is block-based and uses a block format that depends on implementation. Blocks may be further subdivided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TUs (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), if predictor index values are signaled, the parser/entropy decoder (610) can entropy decode the predictor index values, e.g., using context-adaptive binary arithmetic decoding. In some cases, the parser/entropy decoder (610) also entropy decodes differentials for BV values (e.g., using context-adaptive binary arithmetic decoding), then combines the differentials with corresponding predictors to reconstruct the BV values. In other cases, the differential is omitted from the bitstream, and the BV value is simply the predictor (e.g., indicated with the predictor index value). For palette decoding mode, the parser/entropy decoder (610) can decode palette data.

The general decoding control (620) receives the general control data (622) and provides control signals (not shown)

to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-picture predictor (645) receives the intra prediction data (642), such as information indicating whether intra-picture prediction uses spatial prediction or intra BC prediction, as well as prediction mode direction (for intra spatial prediction) or BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction, the intra-picture predictor (645) predicts the sample values of a current block using previously reconstructed sample values of a reference block, which is indicated by a displacement (BV value) for the current block. In some cases, a BV value can be a predicted value. In other cases, the BV value can be different than its predicted value, in which case the BV value is reconstructed using a differential and the predicted value. When special case handling for merged chroma blocks (or other merged secondary component blocks) in intra BC prediction mode is enabled, in some implementations, BV values are consistent with constraints on locations of reference regions, as explained below. In other implementations, when special case handling for merged chroma blocks (or other merged secondary component blocks) in intra BC prediction mode is enabled, the intra-picture predictor (645) can clip certain BV values, perform sample value padding, or select among candidate BV values according to a priority order, as explained below.

For a palette decoding mode, the decoder (600) uses a palette that represents at least some of the sample values of a CU or other unit. The palette maps index values to corresponding colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel. During decoding, for positions in the unit, index values from the palette are replaced with the appropriate sample values. An escape coded value in the unit can be decoded using an escape code value and literal values. The palette can change from unit to unit, based on palette data signaled in the bitstream.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the decoder (600) combines the prediction (658) with reconstructed residual values to produce the reconstruction (638) of the content from the video signal. When residual values have not been encoded/signaled, the decoder (600) uses the values of the prediction (658) as the reconstruction (638).

To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the decoder (600) or a syntax element within the encoded bitstream data. The decoded picture buffer (670) buffers the reconstructed current picture for use in subsequent motion-compensated prediction.

The decoder (600) can also include a post-processing filter. The post-processing filter (608) can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter (608) is applied to reconstructed sample values outside of the motion compensation loop, before output for display.

Depending on implementation and the type of decompression desired, modules of the decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Special Case Handling for Merged Chroma Blocks in Intra BC Prediction.

This section presents examples of special case handling for merged chroma blocks (or other merged secondary component blocks) in intra block copy ("BC") prediction mode.

Without loss of generality, many of the following examples use the terms luma and chroma rather than the more general terms primary component and secondary component. This focuses the description on common examples for YUV formats, but the same approaches can be applied to other types of primary component and second component.

A. Intra BC Prediction—Introduction.

In general, intra BC prediction mode uses intra-picture prediction in which sample values of a current block of a picture are predicted using sample values in the same picture. A block vector ("BV") value indicates a displacement from the current block to a block of the picture (the "reference block") that includes the sample values used for prediction. The reference block provides predicted values for the current block. The sample values used for prediction are previously reconstructed sample values, which are thus available at the encoder during encoding and at the decoder during decoding. The BV value is signaled in the bitstream, and a decoder can use the BV value to determine the reference block of the picture to use for prediction.

Figure 7:
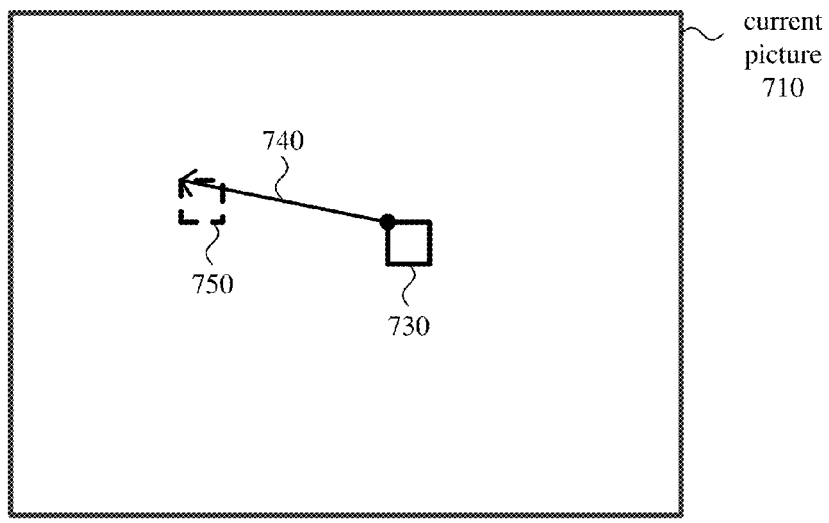
FIGS. 7 and 8 are diagrams illustrating aspects of an example of intra BC prediction for luma blocks of a picture.

FIG. 7 shows an example (700) of intra BC prediction for a current block (730) of a current picture (710). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. Blocks can be symmetrically or asymmetrically partitioned into smaller blocks for purposes of intra BC prediction. More generally, the size of the current block is m×n, where each of m and n is a whole number, and where m and n can be equal to each other or can have different values. Thus, the current block can be square or rectangular. Alternatively, the current block can have some other shape.

The BV value (740) indicates a displacement (or offset) from the current block (730) to a reference block (750) of the picture that includes the sample values used for prediction. The reference block (750) can be identical to the current block (730), or it can be an approximation of the current block (730). Suppose the top-left position of a current block is at position $(x_0, y_0)$ in the current picture, and suppose the top-left position of the reference block is at position $(x_1, y_1)$ in the current picture. The BV value indicates the displacement $(x_1-x_0, y_1-y_0)$. For example, if the top-left position of the current block is at position (256, 128), and the top-left position of the reference block is at position (126, 104), the BV value is (−130, −24). In this example, a negative horizontal displacement indicates a position to the left of the current block, and a negative vertical displacement indicates a position above the current block.

Figure 8:
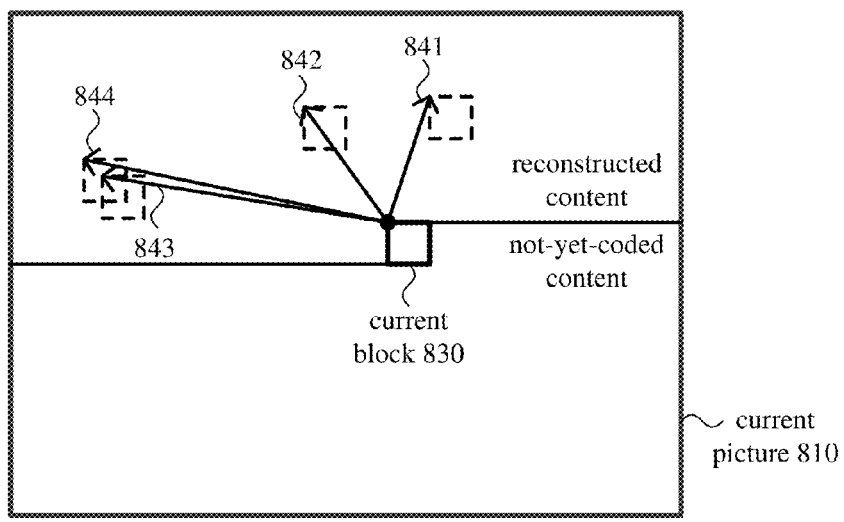

Intra BC prediction can improve coding efficiency by exploiting redundancy (such as repeated patterns inside a picture) using BC operations. Finding a matching reference block for a current block can be computationally complex and time consuming, however, considering the number of candidate reference blocks that the encoder may evaluate. FIG. 8 shows an example (800) illustrating some of the candidate reference blocks for a current block (830) of a current picture (810). Four BV values (841, 842, 843, 844) indicate displacements for four candidate reference blocks. In some example implementations, when wavefront parallel processing ("WPP") is not enabled, the candidate reference blocks can be anywhere within the reconstructed content of the current picture (810). (Blocks are generally coded from left-to-right, then from top-to-bottom.) When WPP is enabled (or, in other example implementations, for all intra BC prediction), additional constraints on locations of the candidate references blocks apply. A candidate reference block can overlap with other candidate reference blocks, as shown for the candidate reference blocks indicated by the BV values (843, 844).

In general, a block with prediction mode of intra BC prediction can be a CB, PB or other block. When the block is a CB, the BV for the block can be signaled at CU level (and other CBs in the CU use the same BV or a scaled version thereof). Or, when the block is a PB, the BV for the block can be signaled at PU level (and other PBs in the PU use the same BV or a scaled version thereof). More generally, the BV for an intra-BC prediction block is signaled at an appropriate syntax level for the block.

Prediction operations for intra BC prediction mode can be applied at the level of CB (when a BV value is signaled per CU or part thereof) or PB (when a BV value is signaled per PU or part thereof). In this case, a reference region is constrained to not overlap the current region or block including the current region. Alternatively, prediction operations can be applied for smaller sections within a PB or CB, even when the BV value is signaled for the PU or CU (or part thereof). For example, for a first section of a block, the reference region includes positions outside the block. For a second section of the block, however, the reference region used in prediction operations can include positions in the previously reconstructed first section of the same block. In this way, a BV value can reference positions in the same PB or CB. Allowing intra BC prediction operations to be applied for sections within a PB or CB facilitates use of BV values with relatively small magnitudes.

B. Examples of Constraints on BV Values, Generally.

In some example implementations, a reference block is constrained to be within the same slice and tile as the current block. Such intra BC prediction does not use sample values in other slices or tiles. The location of a reference block may be subject to one or more other constraints. This section details examples of constraints that the encoder can enforce for intra BC prediction. In general, for a current block, the constraints verify that a candidate reference block indicated by a BV value includes reconstructed sample values that will be available when the current block is encoded or decoded. (Variations of the constraints for merged chroma blocks in intra BC prediction are presented in section VII.E.) The constraints enforced by the encoder on allowable BV values can alternatively be expressed in terms of bitstream conformance requirements with respect to BV values.

Definitions. The current block starts from position $(x_0, y_0)$, relative to the top-left position of the current picture. The width and height of the current block are $w_{block}$ and $h_{block}$, respectively. The current block is part of a current CU (e.g., the current block is a PB). The CTU size is S. The current CU starts from $(x_{CU}, y_{CU})$ relative to the top-left position of the picture. The block vector (used in intra BC prediction for a luma block) is $(BV_x, BV_y)$.

The encoder verifies that all of the following constraints are satisfied.

First Constraint. Specifically, the encoder verifies that the position $(x_0, y_0)$ and the position $(x_0+BV_x, y_0+BV_y)$ are in the same slice, if applicable, and in the same tile, if applicable. That is, the encoder verifies that the top-left position of the current block and the top-left position of the reference block are in the same slice and in the same tile. If the two positions are in different slices or different tiles, the first constraint is not satisfied.

Second Constraint. The encoder verifies that the position $(x_0, y_0)$ and the position $(x_0+BV_x+w_{block}-1, y_0+BV_y+h_{block}-1)$ are in the same slice, if applicable, and same tile, if applicable. That is, the encoder verifies that the top-left position of the current block and the bottom-right position of the reference block are in the same slice and in the same tile. If the two positions are in different slices or different tiles, the second constraint is not satisfied.

For the first and second constraints, if multiple slices are not used, the two positions that are checked are necessarily in the same slice, and the first and second constraints for slices need not be checked, although the reference block is still constrained to be within the current picture. Similarly, if multiple tiles are not used, the two positions that are checked are necessarily in the same tile, and the first and second constraints for tiles need not be checked, although the reference block is still constrained to be within the current picture. All positions of the current block are in a single slice and single tile. If the first and second constraints are satisfied, all positions of the reference block are also in that slice and tile.

Third Constraint. For the third constraint, the encoder verifies that one of the following three conditions is satisfied.

First Condition of Third Constraint. The encoder checks whether $(y_0+BV_y+h_{block}-1)/S<y_0/S$. That is, the encoder calculates the CTU row that includes the bottom edge of the reference block: $(y_0+BV_y+h_{block}-1)/S$. The encoder also calculates the CTU row that includes the top edge of the current block: $y_0/S$. The encoder then checks whether the CTU row that includes the bottom edge of the reference block is above the CTU row that includes the top edge of the current block. If so, the reference block necessarily includes previously reconstructed sample values, at least when WPP is not enabled.

Second Condition of Third Constraint. When $(y_0+BV_y+h_{block}-1)/S=y_0/S$, the encoder checks whether $(x_0+BV_x+w_{block}-1)/S<x_0/S$. That is, if the CTU row that includes the bottom edge of the reference block equals the CTU row that includes the top edge of the current block (same CTU row), the encoder calculates (a) the CTU column that includes the right edge of the reference block $((x_0+BV_x+w_{block}-1)/S)$, and (b) the CTU column that includes the left edge of the current block $(x_0/S)$. The encoder then checks whether the CTU column that includes the right edge of the reference block is left of the CTU column that includes the left edge of the current block. If so, the reference block necessarily includes previously reconstructed sample values.

Third Condition of Third Constraint. When $(y_0+BV_y+h_{block}-1)/S=y_0/S$ and $(x_0+BV_x+w_{block}-1)/S=x_0/S$, the encoder checks whether the z-scan order of the position $(x_0+BV_x+w_{block}-1, y_0+BV_y+h_{block}-1)$ is smaller than the z-scan order of the position $(x_0, y_0)$. That is, if the CTU row that includes the bottom edge of the reference block equals the CTU row that includes the top edge of the current block (same CTU row), and if the CTU column that includes the right edge of the reference block equals the CTU column that includes the left edge of the current block (same CTU column), then the encoder checks whether the bottom-right position of the reference block is earlier in z-scan order than the top-left position of the current block. If so, the block that contains the bottom-right position of the reference block has been previously reconstructed (and hence so has the rest of the reference block). The third condition applies if prediction from within the current CU is allowed. The encoder can also check that the offset value satisfies at least one of the conditions $BV_x+w_{block}\leq 0$ and $BV_y+h_{block}\leq 0$, ensuring that the reference region does not overlap the current region. If prediction from within the current CU is not allowed, $(x_0, y_0)$ should be $(x_{CU}, y_{CU})$.

Figure 9:
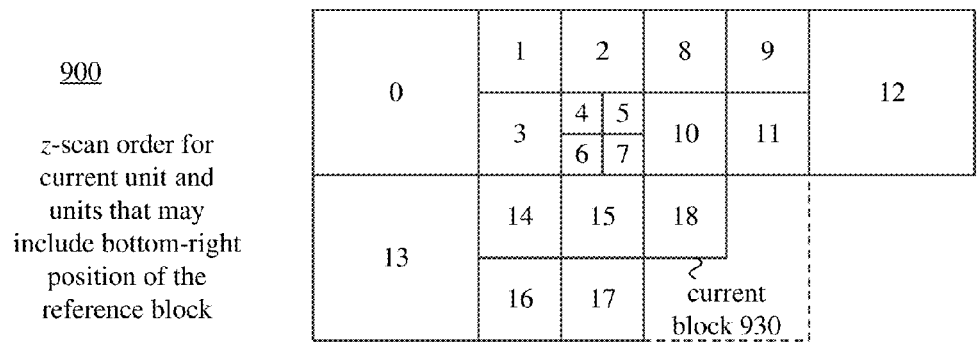
FIG. 9 is a diagram illustrating example z-scan order for units of a picture.

In general, the z-scan order follows a sequentially specified ordering of units that partition a picture. FIG. 9 shows example z-scan order (900) for a current block (930) and units that might include the bottom-right position of a reference block. The z-scan orders are generally assigned to units sequentially from left-to-right in a row, repeating in successive rows from top-to-bottom. When a unit is split, z-scan orders are assigned within the split unit, recursively. For implementations of encoding/decoding for the H.265/HEVC standard, the z-scan order proceeds CTU-to-CTU along a CTU raster scan pattern (left-to-right in a CTU row, repeating in successive CTU rows from top-to-bottom). If a CTU is split, the z-scan order follows a raster scan pattern for CUs of a quadtree within the split CTU. And, if a CU is split (e.g., into multiple CUs, or into multiple PUs), the z-scan order follows a raster scan pattern for blocks within the split CU.

Fourth Constraint. In some example implementations, the encoder checks the fourth constraint when WPP is enabled. In other example implementations, the encoder checks the fourth constraint regardless of whether WPP is enabled. For the fourth constraint, the encoder verifies that $(x_0+BV_x+w_{block}-1)/S-x_0/S<=y_0/S-(y_0+BV_y+h_{block}-1)/S$. That is, the encoder calculates the difference between the CTU column that includes the right edge of the reference block and the CTU column that includes the left edge of the current block: $(x_0+BV_x+w_{block}-1)/S-x_0/S$. The encoder also calculates the difference between the CTU row that includes the top edge of the current block and the CTU row that includes the bottom edge of the reference block: $y_0/S-(y_0+BV_y+h_{block}-1)/S$. The encoder verifies that the first difference (between CTU columns) is less than or equal to the second difference (between CTU rows). More generally, a horizontal displacement value from a reference block to the current block is constrained to be less than or equal to a vertical displacement value from the current block to the reference block. This verifies that the reference block is part of reconstructed content guaranteed to be available for prediction when WPP is enabled, which is the part of the reconstructed content that most commonly yields good BV values.

C. Scaling of BV Values for Chroma Blocks.

In some example implementations, a BV value is signaled for a CU, PU or other unit, and is applied for all blocks of the unit. Depending on color space and color sampling rate, the BV value can be used for all blocks without scaling, or it can be scaled for blocks in different color components. For example, if the format of the picture is YUV 4:2:0, the BV value is scaled by a factor of two horizontally and scaled by a factor of two vertically. Or, if the format of the picture is YUV 4:2:2, the BV value is scaled by a factor of two horizontally. On the other hand, if the format of the picture is YUV 4:4:4, RGB 4:4:4, BGR 4:4:4, or GBR 4:4:4, the BV value used in intra BC prediction for a primary component block is not scaled before use in intra BC prediction for secondary component blocks.

Any of various approaches can be used when scaling a BV value for a unit in order to determined a scaled BV value for intra BC prediction of a chroma block (or other secondary component block). Suppose the BV value used in intra BC prediction for luma blocks is $(YBV_x, YBV_y)$, which corresponds to the BV value $(BV_x, BV_y)$ in the preceding section.

The BV value used in intra BC prediction for chroma blocks is ($CBV_x$, $CBV_y$). The BV ($CBV_x$, $CBV_y$) can be determined as follows:

$$CBV_x = YBV_x >> (SubWidthC-1), \text{ and}$$

$$CBV_y = YBV_y >> (SubHeightC-1), \text{ and}$$

where $>>n$ indicates a right bit shift operation by n bits, and the values of SubWidthC and SubHeightC depend on chroma sampling format, as shown in the following table.

| Chroma sampling format | SubWidthC | SubHeightC |
|---|---|---|
| Monochrome | 1 | 1 |
| 4:2:0 | 2 | 2 |
| 4:2:2 | 2 | 1 |
| 4:4:4 | 1 | 1 |

When SubWidthC or SubHeightC is 1, the chroma BV component value equals the luma BV component value. When SubWidthC or SubHeightC is 2, there are several alternative options for deriving a chroma BV component value from the corresponding luma BV component value, as shown in following table. In this table, $>>n$ indicates a right bit shift by n bits, with rounding down, and / indicates division with rounding towards zero. The function sign(m) returns the sign of m (positive or negative). The function abs(m) returns the absolute value of m.

| Option | Horizontal and Vertical BV Components |
|---|---|
| 1 | $CBV_x = (YBV_x + 1) >> (SubWidthC - 1)$ |
|   | $CBV_y = (YBV_y + 1) >> (SubHeightC - 1)$ |
| 2 | $CBV_x = YBV_x/SubWidthC$ |
|   | $CBV_y = YBV_y/SubHeightC$ |
| 3 | $CBV_x = (YBV_x + 1)/SubWidthC$ |
|   | $CBV_y = (YBV_y + 1)/SubHeightC$ |
| 4 | $CBV_x = sign(YBV_x) * (abs(YBV_x) >> (SubWidthC - 1))$ |
|   | $CBV_y = sign(YBV_y) * (abs(YBV_y) >> (SubHeightC - 1))$ |
| 5 | $CBV_x = sign(YBV_x) * (abs(YBV_x)/SubWidthC)$ |
|   | $CBV_y = sign(YBV_y) * (abs(YBV_y)/SubHeightC)$ |
| 6 | $CBV_x = sign(YBV_x) * ((abs(YBV_x) + 1) >> (SubWidthC - 1))$ |
|   | $CBV_y = sign(YBV_y) * ((abs(YBV_y) + 1) >> (SubHeightC - 1))$ |
| 7 | $CBV_x = sign(YBV_x) * ((abs(YBV_x) + 1)/SubWidthC)$ |
|   | $CBV_y = sign(YBV_y) * ((abs(YBV_y) + 1)/SubHeightC)$ |
| 8 | $CBV_x = sign(YBV_x) * (abs(YBV_x + 1) >> (SubWidthC - 1))$ |
|   | $CBV_y = sign(YBV_y) * (abs(YBV_y + 1) >> (SubHeightC - 1))$ |
| 9 | $CBV_x = sign(YBV_x) * (abs(YBV_x + 1)/SubWidthC)$ |
|   | $CBV_y = sign(YBV_y) * (abs(YBV_y + 1)/SubHeightC)$ |

Alternatively, a chroma BV component value is derived from the corresponding luma BV component value in some other way.

D. Merged Chroma Blocks in Intra BC Prediction Mode.

In some example implementations of intra BC prediction, each PU of a CU can have its own BV value, intra BC prediction is performed for PBs, and the minimum block size at which intra BC prediction is performed is 4×4. When the format of a picture is YUV 4:2:0, if the size of a CU is 8×8, chroma PBs may be smaller than 4×4. If the CU has a single PU (2N×2N pattern), the luma PB has a size of 8×8, and the two corresponding chroma PBs (for U and V components, respectively) each have a size of 4×4. On the other hand, if the CU has multiple PUs (2N×N pattern, N×2N pattern, or N×N pattern), chroma PBs are smaller than 4×4. For the 2N×N pattern, the 8×8 CU has two 8×4 PUs. Each 8×4 PU has an 8×4 luma PB, a 4×2 chroma PB for the U component, and a 4×2 chroma PB for the V component. For the N×2N pattern, the 8×8 CU has two 4×8 PUs. Each 4×8 PU has a 4×8 luma PB, a 2×4 chroma PB for the U component, and a 2×4 chroma PB for the V component. For the N×N pattern, the 8×8 CU has four 4×4 PUs. Each 4×4 PU has a 4×4 luma PB, a 2×2 chroma PB for the U component, and a 2×2 chroma PB for the V component.

Similarly, when the format of a picture is YUV 4:2:2, if the size of a CU is 8×8, chroma PBs may be smaller than 4×4. If the CU has a single PU (2N×2N pattern), the luma PB has a size of 8×8, and the two corresponding chroma PBs (for U and V components, respectively) each have a size of 4×8. For the 2N×N pattern, the 8×8 CU has two 8×4 PUs. Each 8×4 PU has an 8×4 luma PB, a 4×4 chroma PB for the U component, and a 4×4 chroma PB for the V component. For the N×2N pattern, the 8×8 CU has two 4×8 PUs. Each 4×8 PU has a 4×8 luma PB, a 2×8 chroma PB for the U component, and a 2×8 chroma PB for the V component. For the N×N pattern, the 8×8 CU has four 4×4 PUs. Each 4×4 PU has a 4×4 luma PB, a 2×4 chroma PB for the U component, and a 2×4 chroma PB for the V component.

Thus, the size of a luma PB is always at least 4×4. There are several cases, however, in which a chroma PB is smaller than 4×4, as described above. To handle such cases of small chroma PBs, adjacent chroma PBs of a CU are merged into a larger block for intra BC prediction using a single BV value for the larger block. That is, adjacent chroma PBs for a U component are merged into a larger block for intra BC prediction, and adjacent chroma PBs for a V component are merged into a larger block for intra BC prediction. The single BV value for the larger block (including the merged, small chroma PBs) can be derived from the BV values of the corresponding luma PBs. In particular, the BV value of one of the corresponding luma PBs (e.g., the bottom-most, right-most luma PB among the corresponding luma PBs) can be selected for use in intra BC prediction, scaled depending on the format, and used for intra BC prediction for the larger block (including the merged, small chroma PBs).

For example, consider an 8×8 CU with two 4×8 PUs in a picture in YUV 4:2:0 format. The first (left) 4×8 PU has a BV value of (−18, −14), and the second (right) 4×8 PU has a BV value of (−26, −4). For intra BC prediction, the first 4×8 luma PB uses the BV value (−18, −14), and the second 4×8 luma PB uses the BV value (−26, −4). Since the corresponding chroma PBs are smaller than 4×4, adjacent 2×4 chroma PBs are merged for purposes of intra BC prediction using a derived BV value (−13, −2). The derived BV value is the BV value of the bottom-most, right-most luma PB, scaled by a factor of two horizontally and vertically. Left and right 2×4 chroma PBs of the U component are merged into a 4×4 chroma block for intra BC prediction with the derived BV value (−13, −2), and left and right 2×4 chroma PBs of the V component are merged into a 4×4 chroma block for intra BC prediction with the derived BV value (−13, −2).

Figure 10A:
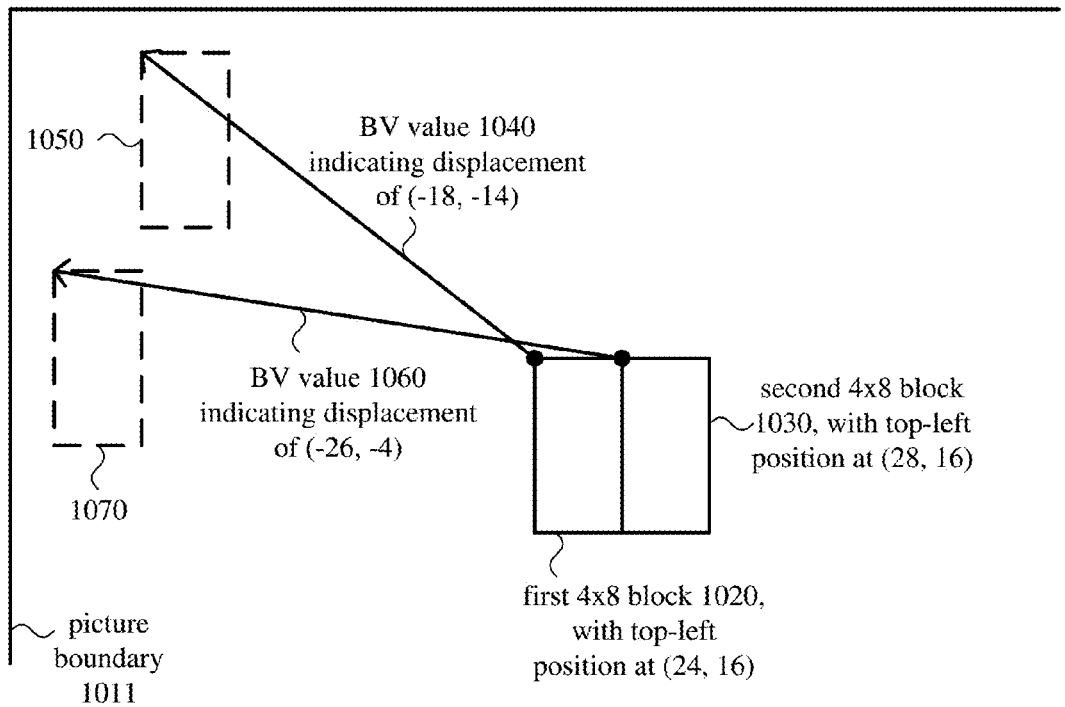
FIG. 10a is a diagram illustrating aspects of intra BC prediction for luma blocks of a picture.
Figure 10B:
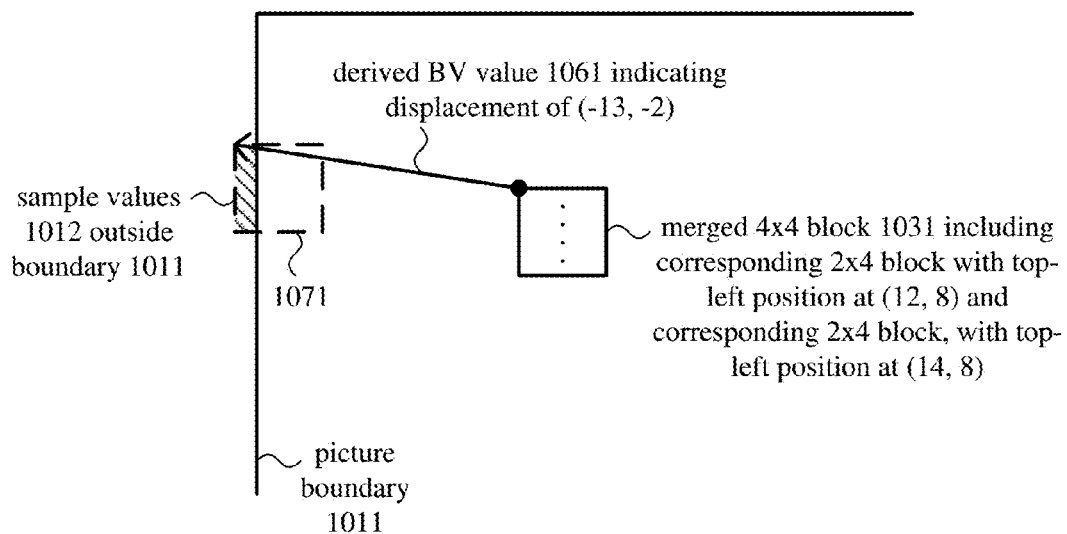
FIG. 10b is a diagram illustrating aspects of intra BC prediction for corresponding merged chroma blocks using a derived BV value.

This approach to merging small chroma PBs into a larger block for intra BC prediction works for most cases. In some cases, however, it can result in references to sample values outside a picture boundary (which are not available) or outside a tile boundary or slice boundary (which might not be available). To illustrate, FIG. 10a shows a portion (1000) of the luma component of a picture (1010) in YUV 4:2:0 format, and FIG. 10b shows a portion (1001) of a chroma component (U component or V component) of the picture (1010) in YUV 4:2:0 format. An 8×8 CU starts at position (24, 16) relative to the top-left corner of the picture (1010) and has two 4×8 PUs. For the luma PBs, as shown in FIG. 10a, a first 4×8 block (1020) has a top-left position at (24, 16), and a second 4×8 block (1030) has a top-left position at (28, 16). For the first 4×8 block (1020), a BV value (1040) indicates a displacement of (−18, −14) to a first reference block (1050) including sample values in the range of [(6, 2), . . . , (9, 9)]. For the second 4×8 block (1030), a BV value (1060) indicates a displacement of (−26, −4) to a second reference block (1070) including sample values in the range of [(2, 12), . . . , (5, 19)]. The sample values of the first reference block (1050) and second reference block (1070) are entirely within the picture boundary (1011) of the picture (1010).

For the corresponding chroma PBs (accounting for horizontal and vertical downsampling by a factor of 2), as shown in FIG. 10b, a merged 4×4 block (1031) includes the corresponding first 2×4 block with a top-left position at (12, 8) and the corresponding second 2×4 block with a top-left position at (14, 8). For the merged 4×4 block (1031), a derived BV value (1061) is based on the BV value (1060) of the second 4×8 block (1030), scaled by a factor of two horizontally and vertically. The derived BV value (1061) indicates a displacement of (−13, −2) to a reference block (1071) including sample values in the range of [(−1, 6), . . . , (2, 9)]. The reference block (1071) includes sample values outside the picture boundary (1011) of the picture (1010), which are undefined. The out-of-boundary sample values [(−1, 6), . . . , (−1, 9)] might not be available during encoding or decoding, or they might have invalid or unexpected values during encoding or decoding.

Alternatively, instead of using the BV value of the bottom-most, right-most luma PB for the merged block, the single BV value for the merged block (including merged, small chroma PBs) can be derived in some other way. For example, the single BV value for the merged block is derived using the BV value of the top-most, left-most luma PB. Or, the single BV value for the merged block is derived using the BV value of the top-most, right-most luma PB. Or, the single BV value for the merged block is derived using the BV value of the bottom-most, left-most luma PB. Or, the single BV value for the merged block is derived as the component-wise averages of the BV values of the corresponding luma PBs. Or, the single BV value for the merged block is derived as the component-wise medians of the BV values of the corresponding luma PBs. Or, the single BV value for the merged block is derived using the BV value covering the largest area among the BV values of the corresponding luma PBs (using one of the preceding options in the event of a tie for the BV value covering the largest area).

In any case, for any way of deriving a single BV value for merged secondary component blocks from the BV values of corresponding primary component blocks, there are possible cases in which the single BV value references sample values outside the picture boundary. The following sections describe various approaches to handling such cases of out-of-boundary sample values for merged secondary component blocks in intra BC prediction mode.

E. Special Case Handling by Enforcing Additional Constraints on BV Values.

When determining BV values to use in intra BC prediction for units (e.g., prediction units), an encoder can check whether the reference block indicated by a derived BV value for merged chroma blocks (or other merged secondary component blocks) includes any out-of-boundary sample values. If so, the encoder disallows the BV value (or BV values) causing the reference to the out-of-boundary sample values with the derived BV value. That is, the encoder can evaluate whether a given BV value leads to referencing out-of-boundary sample values for a derived BV value (based on the given BV value) and, if so, change the given BV value to avoid referencing any out-of-boundary sample values for the derived BV value.

Figure 11A:
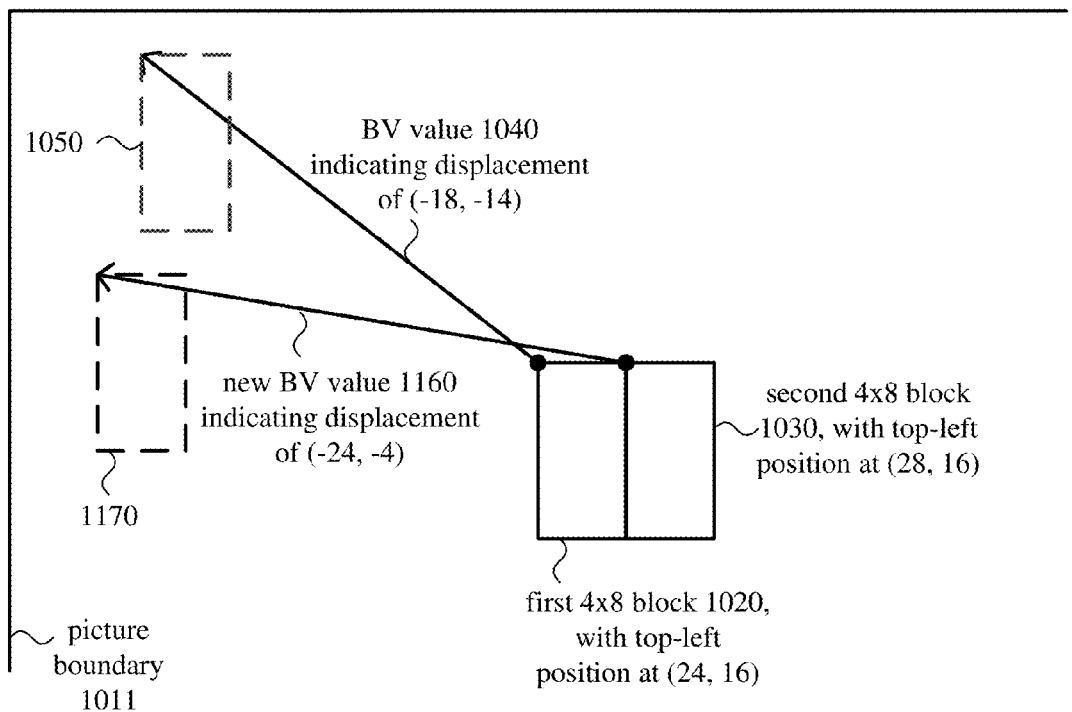
FIGS. 11a and 11b are diagrams illustrating aspects of special case handling for merged chroma blocks in intra BC prediction mode by constraining the value of a BV.
Figure 11B:
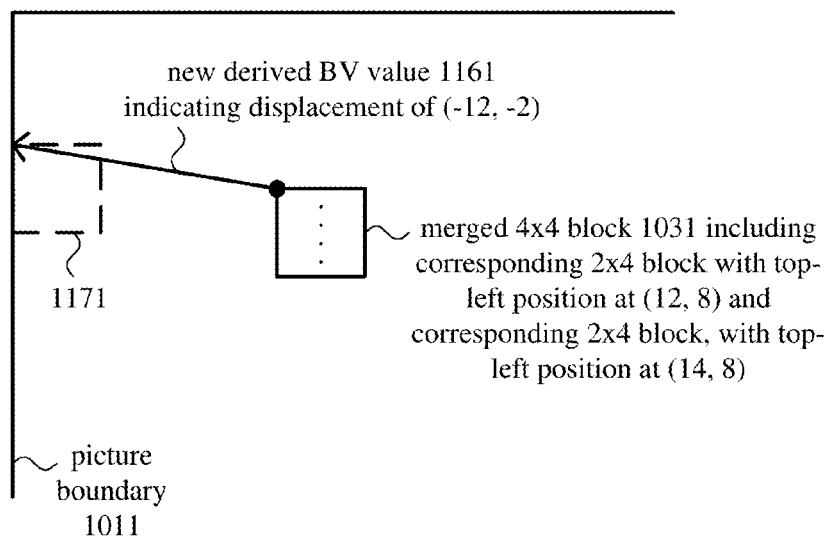

To illustrate, FIG. 11a shows the portion (1000) of the luma component of the picture (1010) in YUV 4:2:0 format from FIG. 10a, and FIG. 11b shows the portion (1001) of the chroma component (U component or V component) of the picture (1010) in YUV 4:2:0 format from FIG. 10b. After determining that the BV value (1060) (shown in FIG. 10a) for the second 4×8 block (1030) leads to a derived BV value (1061) that references out-of-boundary sample values (shown in FIG. 10b), the encoder determines a new BV value (1160) (shown in FIG. 11a) for the second 4×8 block (1030). The new BV value indicates a displacement of (−24, −4). For the merged 4×4 block (1031), a new derived BV value (1161) is based on the new BV value (1160) of the second 4×8 block (1030), scaled by a factor of two horizontally and vertically. The new derived BV value (1161) indicates a displacement of (−12, −2) to a new reference block (1171) including sample values in the range of [(0, 6), . . . , (3, 9)]. The new reference block (1171) no longer includes any sample values outside the picture boundary (1011) of the picture (1010).

In a first set of approaches to special case handling for merged chroma blocks (or other merged secondary component blocks), the encoder selectively enforces one or more additional constraints on a BV value for a unit so that a derived BV value for merged chroma blocks (or other merged secondary component blocks) does not reference any sample value outside a picture boundary. When determining the BV value for a unit, the encoder decides whether the BV value will be used to derive a BV value for merged chroma blocks. This decision can depend on the picture format (e.g., YUV 4:2:0 or YUV 4:2:2 versus YUV 4:4:4), the size of the secondary component blocks for the unit (e.g., the unit will or will not have a chroma block smaller than a threshold size for merger of chroma blocks), and the position of the unit (e.g., whether the unit is the last PU in a CU versus some other PU in the CU). If the BV value of the unit will be used to derive a BV value for merged chroma blocks, the encoder evaluates one or more additional constraints on the BV value. Otherwise, the additional constraint(s) are not evaluated. The first set of approaches involves encoder-side activity, but can be explained in terms of bitstream constraints on allowable BV values. For example, in some example implementations, the constraints enforced by the encoder on allowable BV values are expressed as bitstream conformance requirements with respect to BV values.

In general, the encoder considers base constraints on allowable BV values for a unit. Section VII.E.1 presents examples of base constraints in some example implementations, when determining the BV value for a PU of a CU, considering sample values that will be used for intra BC prediction of a luma PB of the PU (and chroma PBs in a YUV 4:4:4 picture). The encoder considers the base constraints whether or not chroma blocks are merged.

When chroma blocks are merged, the encoder may consider additional constraints on allowable BV values for a unit. Sections VII.E.2 and VII.E.3 present examples of additional constraints in some example implementations, when determining the BV value for a PU of a CU in a YUV 4:2:0 picture or YUV 4:2:2 picture, considering sample values that will be used for intra BC prediction of a merged chroma block that includes one of the chroma PBs of the PU. In general, when a given BV value applies not only to a current PU but also to other PUs, the BV checking process considers sample values used for intra BC prediction for the entire region that includes the current PU and the other PUs. For example, if the BV value of a second PU of a CU also applies for intra BC prediction of a chroma block of a first PU of the CU, the current region is the entire CU. The encoder thus checks that applicable constraints are satisfied for the entire CU (e.g., that the current region and reference region are part of the same slice, if applicable, and same tile, if applicable; that the reference region has been reconstructed in time for intra BC prediction; that the reference region satisfies any WPP-like constraints). The additional constraints apply for only some PUs, as illustrated in FIGS. 12a-12e. Section VII.E.4 describes variations of the additional constraints for alternative BV derivation rules.

1. Examples of Base Constraints for PUs of a Picture.

As explained in section VII.D, in some example implementations of intra BC prediction, each PU of a CU can have its own BV value. Suppose a current PU starts from position $(x_{PU}, y_{PU})$, relative to the top-left position of a current picture. The width and height of the current PU are $w_{PU}$ and $h_{PU}$, respectively. The current PU has a current luma PB with the same position and dimensions as the current PU. The current PU is part of a current CU. The width and height of the current CU are $w_{CU}$ and $h_{CU}$, respectively. The CTU size is S. The current CU starts from $(x_{CU}, y_{CU})$ relative to the top-left position of the picture. The BV used in intra BC prediction for the current luma PB is $(BV_x, BV_y)$. The following constraints, which are closely modeled on the constraints explained in section VII.B, apply for the BV of the current PU.

First Base Constraint. The encoder verifies that the position $(x_{PU}, y_{PU})$ and the position $(x_{PU}+BV_x, y_{PU}+BV_y)$ are in the same slice, if applicable, and in the same tile, if applicable. That is, the encoder verifies that the top-left position of the current luma PB and the top-left position of the reference block are in the same slice and in the same tile. If the two positions are in different slices or different tiles, the first constraint is not satisfied.

Second Base Constraint. The encoder verifies that the position $(x_{PU}, y_{PU})$ and the position $(x_{PU}+BV_x+w_{PU}-1, y_{PU}+BV_y+h_{PU}-1)$ are in the same slice, if applicable, and same tile, if applicable. That is, the encoder verifies that the top-left position of the current luma PB and the bottom-right position of the reference block are in the same slice and in the same tile. If the two positions are in different slices or different tiles, the second constraint is not satisfied.

For the first and second constraints, if multiple slices are not used, the two positions that are checked are necessarily in the same slice, and the first and second constraints for slices need not be checked, although the reference block is still constrained to be within the current picture. Similarly, if multiple tiles are not used, the two positions that are checked are necessarily in the same tile, and the first and second constraints for tiles need not be checked, although the reference block is still constrained to be within the current picture. All positions of the current luma PB are in a single slice and single tile. If the first and second constraints are satisfied, all positions of the reference block are also in that slice and tile.

Third Base Constraint. For the third constraint, the encoder verifies that one of the following three conditions is satisfied.

First Condition of Third Base Constraint. The encoder checks whether $(y_{PU}+BV_y+h_{PU}-1)/S<y_{PU}/S$. That is, the encoder calculates the CTU row that includes the bottom edge of the reference block: $(y_{PU}+BV_y+h_{PU}-1)/S$. The encoder also calculates the CTU row that includes the top edge of the current luma PB: $y_{PU}/S$. The encoder then checks whether the CTU row that includes the bottom edge of the reference block is above the CTU row that includes the top edge of the current luma PB. If so, the reference block necessarily includes previously reconstructed sample values, at least when WPP is not enabled.

Second Condition of Third Base Constraint. When $(y_{PU}+BV_y+h_{PU}-1)/S=y_{PU}/S$, the encoder checks whether $(x_{PU}+BV_x+w_{PU}-1)/S<x_{PU}/S$. That is, if the CTU row that includes the bottom edge of the reference block equals the CTU row that includes the top edge of the current luma PB (same CTU row), the encoder calculates (a) the CTU column that includes the right edge of the reference block $((x_{PU}+BV_x+w_{PU}-1)/S)$, and (b) the CTU column that includes the left edge of the current luma PB $(x_{PU}/S)$. The encoder then checks whether the CTU column that includes the right edge of the reference block is left of the CTU column that includes the left edge of the current luma PB. If so, the reference block necessarily includes previously reconstructed sample values.

Third Condition of Third Base Constraint (if Prediction from within the Current CU is Allowed). The third condition applies if prediction from within the current CU is allowed. When $(y_{PU}+BV_y+h_{PU}-1)/S=y_{PU}/S$ and $(x_{PU}+BV_x+w_{PU}-1)/S=x_{PU}/S$, the encoder checks whether the z-scan order of the position $(x_{PU}+BV_x+w_{PU}-1, y_{PU}+BV_y+h_{PU}-1)$ is smaller than the z-scan order of the position $(x_{PU}, y_{PU})$. That is, if the CTU row that includes the bottom edge of the reference block equals the CTU row that includes the top edge of the current luma PB (same CTU row), and if the CTU column that includes the right edge of the reference block equals the CTU column that includes the left edge of the current luma PB (same CTU column), then the encoder checks whether the bottom-right position of the reference block is earlier in z-scan order than the top-left position of the current luma PB. If so, the block that contains the bottom-right position of the reference block has been previously reconstructed (and hence so has the rest of the reference block). The encoder can also check that the offset value satisfies at least one of the conditions $BV_x+w_{PU} \leq 0$ and $BV_y+h_{PU} \leq 0$, ensuring that the reference region does not overlap the current region.

Fourth Base Constraint. In some example implementations, the encoder checks the fourth base constraint when WPP is enabled. In other example implementations, the encoder checks the fourth base constraint regardless of whether WPP is enabled. For the fourth base constraint, the encoder verifies that $(x_{PU}+BV_x+w_{PU}-1)/S-x_{PU}/S <= y_{PU}/S-(y_{PU}+BV_y+h_{PU}-1)/S$. That is, the encoder calculates the difference between the CTU column that includes the right edge of the reference block and the CTU column that includes the left edge of the current luma PB: $(x_{PU}+BV_x+w_{PU}-1)/S-x_{PU}/S$. The encoder also calculates the difference between the CTU row that includes the top edge of the current luma PB and the CTU row that includes the bottom edge of the reference block: $y_{PU}/S-(y_{PU}+BV_y+h_{PU}-1)/S$. The encoder verifies that the first difference (between CTU columns) is less than or equal to the second difference (between CTU rows). More generally, a horizontal displacement value from a reference block to the current luma PB is constrained to be less than or equal to a vertical displacement value from the current luma PB to the reference block. This verifies that the reference block is part of reconstructed content guaranteed to be available for prediction when WPP is enabled, which is the part of the reconstructed content that most commonly yields good BV values.

As explained in section VII.D, in some example implementations of intra BC prediction, chroma PBs smaller than a threshold size of 4×4 are merged for purposes of intra BC prediction. Sections VII.E.2 and VII.E.3 present examples of additional constraints the encoder can consider when determining the BV value for a PU of a CU in a YUV 4:2:0 picture or YUV 4:2:2 picture, if chroma PBs are smaller than the threshold size. If chroma PBs are not smaller than the threshold size (e.g., because the format of the picture is YUV 4:4:4, or because the CU is larger than 8×8, or because the PU pattern of the CU is 2N×2N), the encoder need not consider the additional constraints.

2. Examples of Additional Constraints for Some PUs in a YUV 4:2:0 Picture.

Figure 12A:
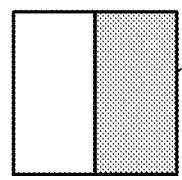
FIGS. 12a to 12e are diagrams illustrating units for which values of BVs are constrained for special case handling for merged chroma blocks in intra BC prediction mode.
Figure 12B:
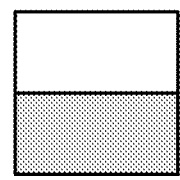
Figure 12C:
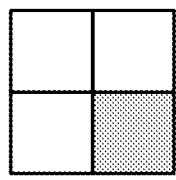

FIGS. 12*a* to 12*c* show PUs of various sizes for an 8×8 CU of a picture in YUV 4:2:0 format. In FIG. 12*a*, the PU pattern is N×2N. FIG. 12*a* shows two 4×8 PUs (1201) of the 8×8 CU. The BV value of the second 4×8 PU is used when deriving the BV value for merged chroma PBs for the entire 8×8 CU. As such, the BV value of the second 4×8 PU is subject to additional constraints. When the index of the current PU is 1 (that is, for the second 4×8 PU), the encoder considers the additional constraints presented in this section.

In FIG. 12*b*, the PU pattern is 2N×N. FIG. 12*b* shows two 8×4 PUs (1202) of the 8×8 CU. The BV value of the second 8×4 PU is used when deriving the BV value for merged chroma PBs for the entire 8×8 CU. As such, the BV value of the second 8×4 PU is subject to additional constraints. When the index of the current PU is 1 (that is, for the second 8×4 PU), the encoder considers the additional constraints presented in this section.

In FIG. 12*c*, the PU pattern is N×N. FIG. 12*c* shows four 4×4 PUs (1203) of the 8×8 CU. The BV value of the fourth 4×4 PU is used when deriving the BV value for merged chroma PBs for the entire 8×8 CU. As such, the BV value of the fourth 4×4 PU is subject to additional constraints. When the index of the current PU is 3 (that is, for the fourth 4×4 PU), the encoder considers the additional constraints presented in this section.

Aside from replacing "PU" with "CU," the following additional constraints are identical to the base constraints presented in section VII.E.1.

First Additional Constraint. The encoder verifies that the position ($x_{CU}$, $y_{CU}$) and the position ($x_{CU}+BV_x$, $y_{CU}+BV_y$) are in the same slice, if applicable, and in the same tile, if applicable. That is, the encoder verifies that the top-left position of the current region (current CU) and the top-left position of the reference region are in the same slice and in the same tile. If the two positions are in different slices or different tiles, the first constraint is not satisfied.

Second Additional Constraint. The encoder verifies that the position ($x_{CU}$, $y_{CU}$) and the position ($x_{CU}+BV_x+w_{CU}-1$, $y_{CU}+BV_y+h_{CU}-1$) are in the same slice, if applicable, and same tile, if applicable. That is, the encoder verifies that the top-left position of the current region (current CU) and the bottom-right position of the reference region are in the same slice and in the same tile. If the two positions are in different slices or different tiles, the second constraint is not satisfied.

For the first and second constraints, if multiple slices are not used, the two positions that are checked are necessarily in the same slice, and the first and second constraints for slices need not be checked, although the reference region is still constrained to be within the current picture. Similarly, if multiple tiles are not used, the two positions that are checked are necessarily in the same tile, and the first and second constraints for tiles need not be checked, although the reference region is still constrained to be within the current picture. All positions of the current region (current CU) are in a single slice and single tile. If the first and second constraints are satisfied, all positions of the reference region are also in that slice and tile.

Third Additional Constraint. For the third constraint, the encoder verifies that one of the following three conditions is satisfied.

First Condition of Third Additional Constraint. The encoder checks whether $(y_{CU}+BV_y\ h_{CU}-1)/S<y_{CU}/S$. That is, the encoder calculates the CTU row that includes the bottom edge of the reference region: $(y_{CU}+BV_y+H_{CU}-1)/S$. The encoder also calculates the CTU row that includes the top edge of the current region: $y_{CU}/S$. The encoder then checks whether the CTU row that includes the bottom edge of the reference region is above the CTU row that includes the top edge of the current region. If so, the reference region necessarily includes previously reconstructed sample values, at least when WPP is not enabled.

Second Condition of Third Additional Constraint. When $(y_{CU}+BV_y+h_{CU}-1)/S=y_{CU}/S$, the encoder checks whether $(x_{CU}+BV_x+w_{CU}-1)/S<x_{CU}/S$. That is, if the CTU row that includes the bottom edge of the reference region equals the CTU row that includes the top edge of the current region (same CTU row), the encoder calculates (a) the CTU column that includes the right edge of the reference region $((x_{CU}+BV_x+w_{CU}-1)/S)$, and (b) the CTU column that includes the left edge of the current region $(x_{CU}/S)$. The encoder then checks whether the CTU column that includes the right edge of the reference region is left of the CTU column that includes the left edge of the current region. If so, the reference region necessarily includes previously reconstructed sample values.

Third Condition of Third Additional Constraint (if Prediction from within the Current CU is Allowed). The third condition applies if prediction from within the current CU is allowed. When $(y_{CU}+BV_y+h_{CU}-1)/S=y_{CU}/S$ and $(x_{CU}+BV_x+w_{CU}-1)/S=x_{CU}/S$, the encoder checks whether the z-scan order of the position $(x_{CU}+BV_x+w_{CU}-1, y_{CU}+BV_y+h_{CU}-1)$ is smaller than the z-scan order of the position $(x_{CU}, y_{CU})$. That is, if the CTU row that includes the bottom edge of the reference region equals the CTU row that includes the top edge of the current region (same CTU row), and if the CTU column that includes the right edge of the reference region equals the CTU column that includes the left edge of the current region (same CTU column), then the encoder checks whether the bottom-right position of the reference region is earlier in z-scan order than the top-left position of the current region. If so, the block that contains the bottom-right position of the reference region has been previously reconstructed (and hence so has the rest of the reference region).

Fourth Additional Constraint. In some example implementations, the encoder checks the fourth additional constraint when WPP is enabled. In other example implementations, the encoder checks the fourth additional constraint regardless of whether WPP is enabled. For the fourth additional constraint, the encoder verifies that $(x_{CU}+BV_x+w_{CU}-1)/S-x_{CU}/S<=y_{CU}/S-(y_{CU}+BV_y+h_{CU}-1)/S$. That is, the encoder calculates the difference between the CTU column that includes the right edge of the reference region and the CTU column that includes the left edge of the current region: $(x_{CU}+BV_x+w_{CU}-1)/S-x_{CU}/S$. The encoder also calculates the difference between the CTU row that includes the top edge of the current region and the CTU row that includes the bottom edge of the reference region: $y_{CU}/S-(y_{CU}BV_y+h_{CU}-1)/S$. The encoder verifies that the first difference (between CTU columns) is less than or equal to the second difference (between CTU rows). More generally, a horizontal displacement value from a reference region to the current region is constrained to be less than or equal to a vertical displacement value from the current region to the reference region. This verifies that the reference region is part of reconstructed content guaranteed to be available for prediction when WPP is enabled, which is the part of the reconstructed content that most commonly yields good BV values.

3. Examples of Additional Constraints for Some PUs in a YUV 4:2:2 Picture.

Figure 12D:
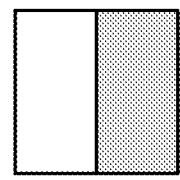
Figure 12E:
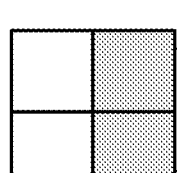

FIGS. 12d and 12e show PUs of various sizes for an 8×8 CU of a picture in YUV 4:2:2 format. In FIG. 12d, the PU pattern is N×2N. FIG. 12d shows two 4×8 PUs (1204) of the 8×8 CU. The BV value of the second 4×8 PU is used when deriving the BV value for merged chroma PBs for the entire 8×8 CU. As such, the BV value of the second 4×8 PU is subject to additional constraints. When the index of the current PU is 1 (that is, for the second 4×8 PU), the encoder considers additional constraints that are identical to the additional constraints presented in section VII.E.2.

In FIG. 12e, the PU pattern is N×N. FIG. 12e shows four 4×4 PUs (1205) of the 8×8 CU. The BV values of the second 4×4 PU and the fourth 4×4 PU are used when deriving BV values for merged chroma PBs. As such, the BV values of the second 4×4 PU and the fourth 4×4 PU are subject to additional constraints. When the index of the current PU is 1 (that is, for the second 4×4 PU), chroma PBs for the first 4×4 PU and second 4×4 PU are merged for intra BC prediction. The encoder considers the following additional constraints, which are similar to those presented in section VII.E.2 but are modified to check the top half of the current CU as the current region. (The height $h_{CU}$ is replaced with the height $h_{CU}/2$.)

The first additional constraint is the same as the first additional constraint presented in section VII.E.2. The encoder verifies that the position $(x_{CU}, y_{CU})$ and the position $(x_{CU}+BV_x, y_{CU}+BV_y)$ are in the same slice, if applicable, and in the same tile, if applicable. The second additional constraint is modified to focus on the top half of the current CU as the current region. The encoder verifies that the position $(x_{CU}, y_{CU})$ and the position $(x_{CU}+BV_x+w_{CU}-1, y_{CU}+BV_y+(h_{CU}/2)-1)$ are in the same slice, if applicable, and same tile, if applicable. For the third additional constraint, the encoder verifies that one of the following three conditions is satisfied:

(1) $(y_{CU}+BV_y+(h_{CU}/2)-1)/S<y_{CU}/S$ (above CTU row);
(2) when $(y_{CU}+BV_y+(h_{CU}/2)-1)/S=y_{CU}/S$, then $(x_{CU}+BV_x+w_{CU}-1)/S<x_{CU}/S$ (same CTU row but left CTU column); or
(3) when $(y_{CU}\ BV_y+(h_{CU}/2)-1)/S=y_{CU}/S$ and $(x_{CU}+BV_x+w_{CU}-1)/S=x_{CU}/S$, the z-scan order of the position $(x_{CU}+BV_x+w_{CU}-1, y_{CU}+BV_y+(h_{CU}/2)-1)$ is smaller than the z-scan order of the position $(x_{CU}, y_{CU})$.

For the fourth additional constraint, the encoder verifies that $(x_{CU}+BV_x+w_{CU}-1)/S-x_{CU}/S<=y_{CU}/S-(y_{CU}+BV_y+(h_{CU}/2)-1)/S$.

In the example of FIG. 12e (N×N pattern for 8×8 CU of picture in YUV 4:2:2 format), when the index of the current PU is 3 (that is, for the fourth 4×4 PU), chroma PBs for the third 4×4 PU and fourth 4×4 PU are merged for intra BC prediction. The encoder considers the following additional constraints, which are similar to those presented in section VII.E.2 but are modified to check the bottom half of the current CU as the current region.

The first and second additional constraints are modified to focus on the bottom half of the current CU as the current region. For the first additional constraint, the encoder verifies that the position $(x_{CU}, y_{CU}+(h_{CU}/2))$ and the position $(x_{CU}+BV_x, y_{CU}+(h_{CU}/2)+BV_y)$ are in the same slice, if applicable, and in the same tile, if applicable. For the second additional constraint, the encoder verifies that the position $(x_{CU}, y_{CU}+(h_{CU}/2))$ and the position $(x_{CU}+BV_x+w_{CU}-1, y_{CU}+(h_{CU}/2)+BV_y+(h_{CU}/2)-1)$ are in the same slice, if applicable, and same tile, if applicable. For the third additional constraint, the encoder verifies that one of the following three conditions is satisfied:

(1) $(y_{CU}+(h_{CU}/2)+BV_y+(h_{CU}/2)-1)/S<(y_{CU}+(h_{CU}/2))/S$ (above CTU row);
(2) when $(y_{CU}+(h_{CU}/2)+BV_y+(h_{CU}/2)-1)/S=(y_{CU}+(h_{CU}/2))/S$, then $(x_{CU}+BV_x+w_{CU}-1)/S<x_{CU}/S$ (same CTU row but left CTU column); or
(3) when $(y_{CU}+(h_{CU}/2)+BV_y+(h_{CU}/2)-1)/S=(y_{CU}+(h_{CU}/2))/S$ and $(x_{CU}+BV_x+w_{CU}-1)/S=x_{CU}/S$, the z-scan order of the position $(x_{CU}+BV_x+w_{CU}-1, y_{CU}+(h_{CU}/2)+BV_y+(h_{CU}/2)-1)$ is smaller than the z-scan order of the position $(x_{CU}, y_{CU})$ (or, if prediction from within the current CU is allowed, smaller than the z-scan order of the position $(x_{CU}, y_{CU}+(h_{CU}/2))$).

For the fourth additional constraint, the encoder verifies that $(x_{CU}+BV_x+w_{CU}-1)/S-x_{CU}/S<=(y_{CU}+(h_{CU}/2))/S-(y_{CU}+(h_{CU}/2)+BV_y+(h_{CU}/2)-1)/S$.

4. Adaptations for Other Derivation Rules.

For the additional constraints described in sections VII.E.2 and VII.E.3, an encoder uses the BV value of the bottom-most, right-most PU when deriving the BV value for merged chroma blocks. If another derivation rule is used, the additional constraints can be modified accordingly.

For example, suppose an encoder uses the BV value of the top-most, right-most PU when deriving the BV value for merged chroma blocks. The encoder enforces additional constraints for the first 4×8 PU in the example of FIG. 12a (index equal to 0 for current PU of 8×8 CU having N×2N pattern of PUs in YUV4:2:0 picture), for the first 8×4 PU in the example of FIG. 12b (index equal to 0 for current PU of 8×8 CU having 2N×N pattern of PUs in YUV4:2:0 picture), for the first 4×4 PU in the example of FIG. 12c (index equal to 0 for current PU of 8×8 CU having N×N pattern of PUs in YUV4:2:0 picture), or for the first 4×8 PU in the example of FIG. 12d (index equal to 0 for current PU of 8×8 CU having N×2N pattern of PUs in YUV4:2:2 picture). In these cases, the current region that is checked for the additional constraints is still the entire CU. The encoder enforces additional constraints for the first and third 4×4 PUs in the example of FIG. 12e (index equal to 0 or 2 for current PU of 8×8 CU having N×N pattern of PUs in YUV4:2:2 picture). In this case, the current region that is checked for the additional constraints is still the top half of the CU (for the first and second 4×4 PUs) or bottom half of the CU (for the second and third 4×4 PUs).

More generally, for a given derivation rule and merger rule for chroma blocks, the encoder applies additional constraints to check that intra BC prediction for the entire region of corresponding units does not reference out-of-boundary sample values.

F. Special Case Handling by Clipping Derived BV.

In a second set of approaches, an encoder clips a derived BV value that references out-of-boundary sample values so that the new, clipped BV value no longer references any out-of-boundary sample values. For example, the encoder checks whether an initial derived BV value references out-of-boundary sample values. If so, the encoder clips the derived BV value. During decoding, a corresponding decoder can perform similar clipping operations.

Figure 13:
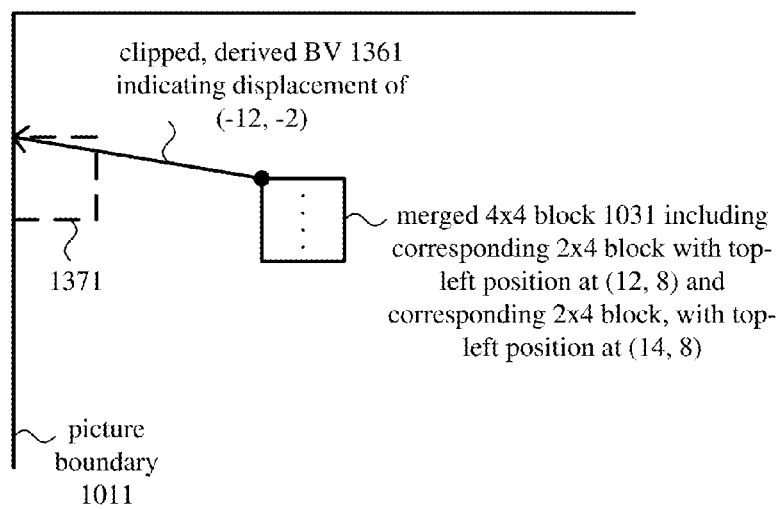
FIG. 13 is a diagram illustrating aspects of special case handling for merged chroma blocks in intra BC prediction mode by clipping the value of a derived BV.

To illustrate, FIG. 13 shows the portion (1001) of the chroma component (U component or V component) of the picture (1010) in YUV 4:2:0 format from FIG. 10b. The encoder checks the derived BV value (1061) (shown in FIG. 10b) for the merged 4×4 block (1031). After determining that the derived BV value (1061) references out-of-boundary sample values (shown in FIG. 10b), the encoder clips the derived BV value (1061) to determine a new, clipped BV value (1361) (shown in FIG. 13). The clipped derived BV value indicates a displacement of (−12, −2) to a new reference block (1371) including sample values in the range of [(0, 6), . . . , (3, 9)]. The new reference block (1371) no longer includes any sample values outside the picture boundary (1011) of the picture (1010).

For example, suppose the derived BV for the entire merged chroma block is ($DBV_x$, $DBV_y$), the merged chroma block starts from ($x_{CB}$, $y_{CB}$), the size of the merged chroma block is ($w_{CB}$, $h_{CB}$), and the size of the chroma component of the picture (in chroma samples) is ($w_{chroma\_comp}$, $h_{chroma\_comp}$). The derived BV is selectively modified as follows:

If $x_{CB}+DBV_x<0$, then $DBV_x=-x_{CB}$.
If $x_{CB}+DBV_x+w_{CB}>=w_{chroma\_comp}$, then $DBV_x=w_{chroma\_comp}-x_{CB}-w_{CB}$.
If $y_{CB}+DBV_y<0$, then $DBV_y=-y_{CB}$.
If $y_{CB}+DBV_y+h_{CB}>=h_{chroma\_comp}$, then $DBV_y=h_{chroma\_comp}-y_{CB}-h_{CB}$.

In the first comparison, the encoder or decoder checks whether the horizontal component of the derived BV value references any location to the left of the left boundary of the picture. If so, the horizontal component of the derived BV value is clipped to end at the left boundary of the picture. In the second comparison, the encoder or decoder checks whether the horizontal component of the derived BV value references any location to the right of the right boundary of the picture. If so, the horizontal component of the derived BV value is clipped to end at the right boundary of the picture. In the third comparison, the encoder or decoder checks whether the vertical component of the derived BV value references any location above the top boundary of the picture. If so, the vertical component of the derived BV value is clipped to end at the top boundary of the picture. Finally, in the fourth comparison, the encoder or decoder checks whether the vertical component of the derived BV value references any location below the bottom boundary of the picture. If so, the vertical component of the derived BV value is clipped to end at the bottom boundary of the picture. Thus, horizontal and vertical components are separately checked.

Depending on the derivation rule used when determining the derived BV value, some of the comparisons may be inapplicable. For example, if the derived BV value is determined by scaling the BV value of the bottom-most, right-most PU, the encoder or decoder need not make the second and fourth comparisons. Or, if the derived BV value is determined by scaling the BV value of the top-most, left-most PU, the encoder or decoder need not make the first and third comparisons.

The preceding examples involve clipping of a derived BV value at a picture boundary. Alternatively, a derived BV value is clipped at a slice boundary and/or a tile boundary. For example, suppose the derived BV for the entire merged chroma block is ($DBV_x$, $DBV_y$), the merged chroma block starts from ($x_{CB}$, $y_{CB}$), and the size of the merged chroma block is ($w_{CB}$, $h_{CB}$). The internal offset value ($x_{relative}$, $y_{relative}$) indicates the position of the start of the chroma block whose unit provided the BV value used when determining the derived BV value, relative to the starting position of the merged chroma block. For example, in a YUV 4:2:0 picture, when the fourth 4×4 PU of an N×N 8×8 CU provides the BV value, the internal offset value ($x_{relative}$, $y_{relative}$) is (2, 2). Or, as another example, in a YUV 4:2:0 picture, when the second 8×4 PU of a 2N×N 8×8 CU provides the BV value, the internal offset value ($x_{relative}$, $y_{relative}$) is (0, 2). The derived BV is selectively modified as follows. If ($x_{CB}+DBV_x$, $y_{CB}+DBV_y$) and ($x_{CB}$, $y_{CB}$) are in different slices or different tiles, then $DBV_x=DBV_x+x_{relative}$ if needed to put the two positions in the same slice or tile, and $DRV_y=DBV_y+y_{relative}$ if needed to put the two positions in the same slice or tile. In this way, the horizontal component and/or vertical component of the derived BV value is clipped to avoid references outside the current slice or tile. The adjustments described in this paragraph work if the derived BV value is determined by scaling the BV value of the bottom-most, right-most PU. For another derivation rule, the adjustments are modified accordingly.

G. Special Case Handling by Padding Sample Values at Boundaries.

In a third set of approaches, an encoder pads sample values away from the boundary of a picture as needed to provide out-of-boundary sample values for intra BC prediction. Or, the encoder uses default sample values as needed to provide out-of-boundary sample values for intra BC prediction. During intra BC prediction, the encoder identifies references to out-of-boundary sample values. The encoder replaces an out-of boundary sample value with the sample value from the closest boundary position or with a default sample value. During decoding, a corresponding decoder can perform similar operations during intra BC prediction to replace out-of-boundary sample values with sample values from the closest boundary positions or default sample values.

To illustrate, FIG. 14 shows the portion (1001) of the chroma component (U component or V component) of the picture (1010) in YUV 4:2:0 format from FIG. 10b. The encoder determines that the derived BV value (1061) references out-of-boundary sample values in the reference block (1071) (shown in FIG. 10b). The encoder replaces the out-of-boundary sample values with extrapolated sample values (1470) outside the picture boundary (1011) (shown in FIG. 14). For the extrapolated sample values (1470) in the range of [(−1, 6), . . . , (−1, 9)], the sample values in the range of [(0, 6), . . . , (0, 9)] are repeated as shown in FIG. 14.

For example, suppose the size of the chroma component of the picture (in chroma samples) is ($w_{chroma\_comp}$, $h_{chroma\_comp}$), and suppose the position of a reference sample value in the reference region is ($x_{ref}$, $y_{ref}$). When the sample value of the nearest boundary position (according to simple horizontal or vertical extrapolation) is used for padding, the positions used during intra BC prediction are selectively modified as follows.

If $x_{ref}<0$, then $x_{ref}=0$.
If $x_{ref}>=w_{chroma\_comp}$, then $x_{ref}=w_{chroma\_comp}-1$.
If $y_{ref}<0$, then $y_{ref}=0$.
If $y_{ref}>=h_{chroma\_comp}$, then $y_{ref}=h_{chroma\_comp}-1$.

In the first comparison, the encoder or decoder checks whether the reference sample value is to the left of the left boundary of the picture. If so, the sample value at the left boundary of the picture and in the same row is used for intra BC prediction. In the second comparison, the encoder or decoder checks whether the reference sample value is to the right of the right boundary of the picture. If so, the sample value at the right boundary of the picture and in the same row is used for intra BC prediction. In the third comparison, the encoder or decoder checks whether the reference sample value is above the top boundary of the picture. If so, the sample value at the top boundary of the picture and in the same column is used for intra BC prediction. Finally, in the fourth comparison, the encoder or decoder checks whether the reference sample value is below the bottom boundary of the picture. If so, the sample value at the bottom boundary of the picture and in the same column is used for intra BC prediction. Alternatively, the encoder or decoder uses another padding rule (e.g., linear combination of multiple sample values at or within the boundary).

Depending on the derivation rule used when determining the derived BV value, some of the comparisons may be inapplicable. For example, if the derived BV value is determined by scaling the BV value of the bottom-most, right-most PU, the encoder or decoder need not make the second and fourth comparisons. Or, if the derived BV value is determined by scaling the BV value of the top-most, left-most PU, the encoder or decoder need not make the first and third comparisons.

When an out-of-boundary sample value is replaced with a default sample value, the default sample value can be the middle of the range of possible values. For example, if the bit depth is bd, the default sample value is 1<<(bd−1). Alternatively, the default sample value has some other defined value.

The preceding examples involve replacement of out-of-boundary sample values outside a picture boundary. Alternatively, out-of-boundary sample values are replaced outside a slice boundary and/or a tile boundary. For example, the out-of-boundary sample value are replaced with sample values at nearest positions along the slice boundary and/or tile boundary. Or, the out-of-boundary sample values are replaced with a default sample value.

H. Special Case Handling by Evaluating Different Derived BV Values Until a Suitable Derived BV Value is Found.

In a fourth set of approaches, when deriving a BV value for merged chroma blocks, an encoder evaluates multiple candidate BV values until it finds a suitable derived BV value (that is, one that does not reference any out-of-boundary sample values for intra BC prediction). The multiple candidate BV values can be successively evaluated in a priority order. If none of the candidate BV values is suitable, the encoder can use another approach for special case handling (e.g., enforcing additional constraints on the first candidate BV value in the priority order, clipping of the first candidate BV value in the priority order, padding). During decoding, a corresponding decoder can perform similar operations when deriving a BV value for merged chroma blocks, successively evaluating multiple candidate BV values in a priority order. If none of the candidate BV values is suitable, the decoder can use the other approach for special case handling (e.g., clipping of the first candidate BV value in the priority order, padding) used by the encoder.

For example, the priority order ranks BV values of PUs of a CU, for use in deriving a single BV value for merged chroma blocks. One priority order is BV value of: (1) bottom-most, right-most PU, (2) bottom-most, left-most PU, (3) top-most, right-most PU, and (4) top-most, left-most PU. Another priority order is BV value of: (1) top-most, left-most PU, (2) top-most, right-most PU, (3) bottom-most, left-most PU, and (4) bottom-most, right-most PU. Alternatively, a priority order includes other and/or additional options such as component-wise median of BV values of the PUs of a CU or component-wise average of the BV values of the PUs of a CU. Or, the priority order can favor the most common BV value among the BV values of the PUs of a CU, which "covers" the most area for the CU.

During encoding or decoding, candidate BV values for use in deriving a single BV value for merged chroma blocks are successively evaluated in priority order, until a suitable BV value is found. That is, the first candidate BV value in the priority order is evaluated. If the first candidate BV value in the priority order is unsuitable (leads to references to out-of boundary sample values for a derived BV value), the second candidate BV value in the priority order is evaluated, and so on. The encoder and decoder use the same priority order.

I. Special Case Handling for Merged Secondary Component Blocks, Generally.

FIG. 15 shows a generalized technique (1500) for encoding with special case handling for merged chroma blocks (or other merged secondary blocks) in intra BC prediction mode. A media encoder such as the video encoder (340) described with reference to FIG. 3, video encoder (500) described with reference to FIGS. 5a and 5b, or other encoder can perform the technique (1500).

The encoder encodes (1510) a picture to produce encoded data and outputs (1520) the encoded data. The encoding (1510) includes intra BC prediction for a set of adjacent units of the picture. For example, each unit of the set of adjacent units is a prediction unit, and the set of adjacent units is a set of prediction units of a single coding unit. Alternatively, the adjacent units are some other type of unit of media.

The encoder can merge secondary component blocks (e.g., chroma blocks) for purposes of intra BC prediction. In particular, the encoder selectively merges secondary component blocks for purposes of intra BC prediction depending on factors such as picture format and size of secondary component blocks of the units. For example, the encoder determines picture format and size of secondary component blocks of units. The encoder selectively merges secondary component blocks for purposes of intra BC prediction if the picture format is YUV 4:2:0 or YUV 4:2:2 (but not YUV 4:4:4), and if the size of secondary component blocks of the units is below a threshold size. Thus, as further detailed in section VII.E, small secondary component blocks (below the threshold size) can be merged into a larger block for intra BC prediction. Otherwise, the encoder does not merge secondary component blocks for purposes of intra BC prediction.

When secondary component blocks are not merged as part of intra BC prediction (e.g., because the picture format is YUV 4:4:4 or the size of the secondary component blocks of the units is larger than the threshold size), the encoder uses the same BV value for a primary component block (e.g., luma block) and secondary component blocks (e.g., chroma blocks). For example, for each unit of a given set of adjacent units, the encoder performs intra BC prediction for a primary component block and secondary component blocks of the unit using a BV value associated with the unit.

On the other hand, when secondary component blocks are merged as part of intra BC prediction (e.g., because the picture format is YUV 4:2:0 or 4:2:2, and the size of the secondary component blocks of the units is smaller than the threshold size), for each unit of the set of adjacent units, the encoder performs intra BC prediction for a primary component block (e.g., luma block) of the unit using a BV value associated with the unit. The encoder derives a BV value for secondary component blocks (e.g., chroma blocks) of the set of adjacent units based at least in part on one or more of the BV values associated with the adjacent units. The encoder then performs intra BC prediction for the secondary component blocks using the derived BV value, where adjacent blocks among the secondary component blocks are merged for purposes of the intra BC prediction. The encoding (1510) includes special case handling for any value of the derived BV value (for merged secondary component blocks) referencing sample values outside a boundary, which may be a picture boundary, slice boundary or tile boundary.

In a first set of approaches for the special case handling, when the encoder determines BV values associated with the adjacent units during BV estimation, the encoder enforces one or more constraints on a given BV value of the BV values so that the derived BV value does not reference any sample values outside the boundary. For example, suppose the primary component blocks define a current region for the set of adjacent units, and the given BV value indicates a reference region for the set of adjacent units. The one or more constraints ensure that no sample value in the reference region is outside the boundary. Examples of constraints ("additional constraints") are described in sections VII.E.2 to VII.E.4. Alternatively, the encoder considers other and/or additional constraints. The encoder can enforce the constraint(s) for a subset of the set of adjacent units, depending on the size of the adjacent units and chroma sampling rate for the picture. For example, the encoder enforces the constraint(s) for selected prediction units as described in sections VII.E.2 to VII.E.4. The constraint(s) enforced by the encoder on allowable BV values can be expressed as bitstream conformance requirements for BV values in encoded data in a bitstream.

In a second set of approaches for the special case handling, the encoder clips the derived BV value if the derived BV value references any sample values outside the boundary. The new, clipped BV value references only sample values at or within the boundary. For example, the encoder clips the boundary according to an approach described in section VII.F. Alternatively, the encoder uses another approach to selectively clip the derived BV value.

In a third set of approaches for the special case handling, the encoder pads sample values away from the boundary or uses default sample values when the derived BV value references sample values outside the boundary. For example, the encoder replaces out-of-boundary sample values according to an approach described in section VII.G. Alternatively, the encoder uses another approach to replace out-of-boundary sample values.

In a fourth set of approaches for the special case handling, when the encoder determines BV values associated with the adjacent units during BV estimation, the encoder evaluates, according to a priority order, different candidate BV values used to derive a single BV value for merged secondary component blocks, until the derived BV value does not reference any sample values outside the boundary. For example, the encoder evaluates candidate BV values according to an approach described in section VII.H. Alternatively, the encoder uses another approach to evaluate candidate BV values.

FIG. 16 shows a generalized technique (1600) for decoding with special case handling for merged chroma blocks (or other merged secondary component blocks) in intra BC prediction mode. A media decoder such as the video decoder (450) described with reference to FIG. 4, video decoder (600) described with reference to FIG. 6, or other decoder can perform the technique (1600).

The decoder receives (1610) encoded data and decodes (1620) a picture using the encoded data. The decoding (1620) includes intra BC prediction for a set of adjacent units of the picture. For example, each unit of the set of adjacent units is a prediction unit, and the set of adjacent units is a set of prediction units of a single coding unit. Alternatively, the adjacent units are some other type of unit of media.

The decoder can merge secondary component blocks (e.g., chroma blocks) for purposes of intra BC prediction. In particular, the decoder selectively merges secondary component blocks for purposes of intra BC prediction depending on factors such as picture format and size of secondary component blocks of the units. For example, the decoder determines picture format and size of secondary component blocks of units. The decoder selectively merges secondary component blocks for purposes of intra BC prediction if the picture format is YUV 4:2:0 or YUV 4:2:2 (but not YUV 4:4:4), and if the size of secondary component blocks of units is below a threshold size. Thus, as further detailed in section VII.E, small secondary component blocks (below the threshold size) can be merged into a larger block for intra BC prediction. Otherwise, the decoder does not merge secondary component blocks for purposes of intra BC prediction.

When secondary component blocks are not merged as part of intra BC prediction (e.g., because the picture format is YUV 4:4:4 or the size of the secondary component blocks of the units is larger than the threshold size), the decoder uses the same BV value for a primary component block (e.g., luma block) and secondary component blocks (e.g., chroma blocks). For example, for each unit of a given set of adjacent units, the decoder performs intra BC prediction for a primary component block and secondary component blocks of the unit using a BV value associated with the unit.

On the other hand, when secondary component blocks are merged as part of intra BC prediction (e.g., because the picture format is YUV 4:2:0 or 4:2:2, and the size of the secondary component blocks of the units is smaller than the threshold size), for each unit of the set of adjacent units, the decoder performs intra BC prediction for a primary component block (e.g., luma block) of the unit using a BV value associated with the unit. The decoder derives a BV value for secondary component blocks (e.g., chroma blocks) of the set of adjacent units based at least in part on one or more of the BV values associated with the adjacent units. The decoder then performs intra BC prediction for the secondary component blocks using the derived BV value, where adjacent blocks among the secondary component blocks are merged for purposes of the intra BC prediction. The decoding (1610) includes special case handling for any value of the derived BV value (for merged secondary component blocks) referencing sample values outside a boundary, which may be a picture boundary, slice boundary or tile boundary.

In a first set of approaches for the special case handling, according to bitstream conformance requirements, a given BV value of the BV values is constrained so that the derived BV value does not reference any sample values outside the boundary. For example, suppose the primary component blocks define a current region for the set of adjacent units, and the given BV value indicates a reference region for the set of adjacent units. One or more constraints ensure that no sample value in the reference region is outside the boundary. Examples of constraints ("additional constraints") are described in sections VII.E.2 to VII.E.4. Alternatively, other and/or additional constraints are enforced. The constraint(s) may be enforced for a subset of the set of adjacent units, depending on the size of the adjacent units and chroma sampling rate for the picture. For example, the constraint(s)

are enforced for selected prediction units as described in sections VII.E.2 to VII.E.4. The constraint(s) can be expressed as bitstream conformance requirements for BV values in encoded data in a bitstream.

In a second set of approaches for the special case handling, the decoder clips the derived BV value if the derived BV value references any sample values outside the boundary. The new, clipped BV value references only sample values at or within the boundary. For example, the decoder clips the boundary according to an approach described in section VII.F. Alternatively, the decoder uses another approach to selectively clip the derived BV value.

In a third set of approaches for the special case handling, the decoder pads sample values away from the boundary or uses default sample values when the derived BV value references sample values outside the boundary. For example, the decoder replaces out-of-boundary sample values according to an approach described in section VII.G. Alternatively, the decoder uses another approach to replace out-of-boundary sample values.

In a fourth set of approaches for the special case handling, when the decoder reconstructs BV values associated with the adjacent units, the decoder evaluates, according to a priority order, different candidate BV values used to derive a single BV value for merged secondary component blocks, until the derived BV value does not reference any sample values outside the boundary. For example, the decoder evaluates candidate BV values according to an approach described in section VII.H. Alternatively, the decoder uses another approach to evaluate candidate BV values.

J. Alternatives and Variations.

In many of the examples described herein, an encoder enforces constraints on allowable BV values. The constraints can alternatively be considered constraints on values of syntax elements in a bitstream or constraints on BV values when reconstructed during decoding, where the encoder still selects the BV values. That is, the constraints can be expressed as bitstream conformance requirements for BV values in encoded data in a bitstream.

In many of the examples described herein, intra BC prediction and motion compensation are implemented in separate components or processes, and BV estimation and motion estimation are implemented in separate components or processes. Alternatively, intra BC prediction can be implemented as a special case of motion compensation, and BV estimation can be implemented as a special case of motion estimation, for which the current picture is used as a reference picture. In such implementations, a BV value can be signaled as an MV value but used for intra BC prediction (within the current picture) rather than inter-picture prediction. As the term is used herein, "intra BC prediction" indicates prediction within a current picture, whether that prediction is provided using an intra-picture prediction module, a motion compensation module, or some other module. Similarly, a BV value can be represented using an MV value or using a distinct type of parameter or syntax element, and BV estimation can be provided using an intra-picture estimation module, motion estimation module or some other module.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising a processor and memory, wherein the computer system is configured to implement a media encoder that performs media processing comprising:
    encoding a picture to produce encoded data, wherein the encoding includes intra block copy ("BC") prediction for a set of adjacent units of the picture, including:
        determining block vector ("BV") values associated with the adjacent units during BV estimation;
        for each unit of the set of adjacent units, performing the intra BC prediction for a primary component block of the unit using one of the BV values that is associated with the unit;
        deriving a BV value for secondary component blocks of the set of adjacent units based at least in part on one or more of the BV values associated with the adjacent units; and
        performing the intra BC prediction for the secondary component blocks using the derived BV value, wherein adjacent blocks among the secondary component blocks are merged for purposes of the intra BC prediction;
        wherein the encoding further includes special case handling for any value of the derived BV value referencing sample values outside a boundary, wherein the determining the BV values includes, for the special case handling, enforcing one or more constraints on a given BV value of the BV values so that the derived BV value does not reference any sample values outside the boundary; and
    outputting the encoded data.

2. The computer system of claim 1, wherein each unit of the set of adjacent units is a prediction unit, and wherein the set of adjacent units is a set of prediction units of a single coding unit.

3. The computer system of claim 1, wherein the primary component blocks are luma blocks and the secondary component blocks are chroma blocks.

4. The computer system of claim 1, wherein the secondary component blocks of the set of adjacent units have a size below a threshold size at which secondary component blocks are merged for the intra BC prediction, and wherein the encoding further includes intra BC prediction for another set of adjacent units, including, for each unit of the other set of adjacent units, performing the intra BC prediction for a primary component block and secondary component blocks of the unit using a BV value associated with the unit.

5. The computer system of claim 1, wherein the primary component blocks define a current region for the set of adjacent units, wherein the given BV value indicates a reference region for the set of adjacent units, and wherein the one or more constraints ensure that no sample value in the reference region is outside the boundary.

6. The computer system of claim 1, wherein the primary component blocks define a current region for the set of adjacent units, wherein the given BV value indicates a reference region for the set of adjacent units, and wherein the one or more constraints include:
    (1) a top-left position of the current region and a top-left position of the reference region are in the same slice, if applicable, and in the same tile, if applicable;
    (2) the top-left position of the current region and a bottom-right position of the reference region are in the same slice, if applicable, and in the same tile, if applicable;

(3) one of the following three conditions is satisfied:
(a) a coding tree unit ("CTU") row that includes a bottom edge of the reference region is above a CTU row that includes a top edge of the current region;
(b) if the CTU row that includes the bottom edge of the reference region equals the CTU row that includes the top edge of the current region, then a CTU column that includes the right edge of the reference region is left of a CTU column that includes a left edge of the current region; and
(c) if the CTU row that includes the bottom edge of the reference region equals the CTU row that includes the top edge of the current region, and if the CTU column that includes the right edge of the reference region equals the CTU column that includes the left edge of the current region, then the bottom-right position of the reference region is earlier in z-scan order than the top-left position of the current region; and
(4) a horizontal displacement value from the reference region to the current region is less than or equal to a vertical displacement value from the current region to the reference region.

7. The computer system of claim 1, wherein the one or more constraints are enforced for a subset of the set of adjacent units, the subset depending on size of the adjacent units and chroma sampling rate for the picture.

8. In a computer system that implements a media decoder, a method comprising:
receiving encoded data; and
decoding a picture using the encoded data, wherein the decoding includes intra block copy ("BC") prediction for a set of adjacent units of the picture, including:
reconstructing block vector ("BV") values associated with the adjacent units:
for each unit of the set of adjacent units, performing the intra BC prediction for a primary component block of the unit using one of the BV values that is associated with the unit;
deriving a BV value for secondary component blocks of the set of adjacent units based at least in part on one or more of the BV values associated with the adjacent units; and
performing the intra BC prediction for the secondary component blocks using the derived BV value, wherein adjacent blocks among the secondary component blocks are merged for purposes of the intra BC prediction;
wherein the decoding further includes special case handling for any value of the derived BV value referencing sample values outside a boundary, and wherein the reconstructing includes, for the special case handling, evaluating, according to a priority order, different candidate BV values used to determine the derived BV value until the derived BV value does not reference any sample values outside the boundary.

9. The method of claim 8, wherein each unit of the set of adjacent units is a prediction unit, and wherein the set of adjacent units is a set of prediction units of a single coding unit.

10. The method of claim 8, wherein the primary component blocks are luma blocks and the secondary component blocks are chroma blocks.

11. The method of claim 8, wherein the secondary component blocks of the set of adjacent units have a size below a threshold size at which secondary component blocks are merged for the intra BC prediction, and wherein the decoding further includes intra BC prediction for another set of adjacent units, including, for each unit of the other set of adjacent units, performing the intra BC prediction for a primary component block and secondary component blocks of the unit using a BV value associated with the unit.

12. A computer system comprising a processor and memory, wherein the computer system is configured to implement a media decoder that performs media processing comprising:
receiving encoded data; and
decoding a picture using the encoded data, wherein the decoding includes intra block copy ("BC") prediction for a set of adjacent units of the picture, including:
for each unit of the set of adjacent units, performing the intra BC prediction for a primary component block of the unit using a block vector ("BV") value associated with the unit;
deriving a BV value for secondary component blocks of the set of adjacent units based at least in part on one or more of the BV values associated with the adjacent units; and
performing the intra BC prediction for the secondary component blocks using the derived BV value, wherein adjacent blocks among the secondary component blocks are merged for purposes of the intra BC prediction;
wherein the decoding further includes special case handling for any value of the derived BV value referencing sample values outside a boundary, the special case handling including padding sample values away from the boundary or using default sample values when the derived BV value references sample values outside the boundary.

13. The computer system of claim 12, wherein each unit of the set of adjacent units is a prediction unit, and wherein the set of adjacent units is a set of prediction units of a single coding unit.

14. The computer system of claim 12, wherein the primary component blocks are luma blocks and the secondary component blocks are chroma blocks.

15. The computer system of claim 12, wherein the secondary component blocks of the set of adjacent units have a size below a threshold size at which secondary component blocks are merged for the intra BC prediction, and wherein the decoding further includes intra BC prediction for another set of adjacent units, including, for each unit of the other set of adjacent units, performing the intra BC prediction for a primary component block and secondary component blocks of the unit using a BV value associated with the unit.

* * * * *